(12) United States Patent
Wang et al.

(10) Patent No.: US 9,237,330 B2
(45) Date of Patent: Jan. 12, 2016

(54) FORMING A STEREOSCOPIC VIDEO

(75) Inventors: Sen Wang, Rochester, NY (US); Kevin Edward Spaulding, Spencerport, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 593 days.

(21) Appl. No.: 13/400,608

(22) Filed: Feb. 21, 2012

(65) Prior Publication Data
US 2013/0215220 A1 Aug. 22, 2013

(51) Int. Cl.
*H04N 13/00* (2006.01)
*H04N 13/02* (2006.01)
*G09G 5/00* (2006.01)
*G06T 15/00* (2011.01)

(52) U.S. Cl.
CPC ........... *H04N 13/021* (2013.01); *H04N 13/026* (2013.01); *H04N 13/0271* (2013.01); *H04N 13/0296* (2013.01); *H04N 2013/0081* (2013.01)

(58) Field of Classification Search
CPC ....... H04N 13/00; H04N 13/04; H04N 13/02; H04N 2201/02493; H04N 3/04; H04N 13/0418; H04N 13/0011; H04N 1/0429; H04N 13/0217; H04N 13/021; H04N 13/0232; G09G 5/00; H04W 88/02; G06F 17/50; G06K 9/54; G06K 9/00201; G06K 9/62; G06T 2207/10021; G06T 5/006; G06T 15/20
USPC .......... 348/43, 47, 51, 42, E13.063; 345/629; 455/556.1
See application file for complete search history.

(56) References Cited

U.S. PATENT DOCUMENTS

| | | | | |
|---|---|---|---|---|
| 5,963,213 A * | 10/1999 | Guedalia et al. | ...... | G06T 3/0043 345/427 |
| 6,573,889 B1 * | 6/2003 | Georgiev | ............. | H04N 1/6058 345/419 |
| 8,289,998 B2 * | 10/2012 | Kim et al. | ...................... | 370/474 |
| 8,666,146 B1 * | 3/2014 | Smolic et al. | ........ | H04N 13/026 348/42 |
| 2002/0061131 A1 * | 5/2002 | Sawhney et al. | ............... | 382/154 |
| 2002/0122113 A1 * | 9/2002 | Foote | .................... | G06T 3/4038 348/48 |
| 2005/0285875 A1 * | 12/2005 | Kang et al. | ..................... | 345/629 |
| 2006/0028473 A1 * | 2/2006 | Uyttendaele et al. | ......... | 345/473 |
| 2006/0028489 A1 * | 2/2006 | Uyttendaele et al. | ......... | 345/646 |
| 2007/0109300 A1 * | 5/2007 | Li | .......................... | G06T 7/0022 345/427 |
| 2008/0228449 A1 * | 9/2008 | Birtwistle et al. | ................ | 703/1 |
| 2010/0208750 A1 * | 8/2010 | Kim et al. | ...................... | 370/474 |
| 2010/0220932 A1 * | 9/2010 | Zhang et al. | .................. | 382/209 |

(Continued)

OTHER PUBLICATIONS

"Hybrid Scene Reconstruction by Integrating Scan Data and Stero Mage Pairs" by xiangying Ma et al., 0-7695-2939-4/07 (c) 2007 IEEE.*

(Continued)

*Primary Examiner* — Dramos I Kalapodas

(57) ABSTRACT

A method for forming a stereoscopic video of a scene from first and second input digital videos captured using respective first and second digital video cameras, wherein the first and second input digital videos include overlapping scene content and overlapping time durations. The method includes determining camera positions for each frame of the first and second input digital videos, and determining first-eye and second-eye viewpoints for each frame of the stereoscopic video. First-eye and second-eye images are formed for each frame of the stereoscopic video responsive to the corresponding video frames in the first and second input digital videos and the associated camera positions.

24 Claims, 12 Drawing Sheets

(56) References Cited

U.S. PATENT DOCUMENTS

| | | | |
|---|---|---|---|
| 2011/0026764 | A1 | 2/2011 | Wang |
| 2011/0032341 | A1* | 2/2011 | Ignatov et al. ............... 348/51 |
| 2011/0117958 | A1* | 5/2011 | Kim et al. ............... 455/556.1 |
| 2012/0056998 | A1* | 3/2012 | Kang et al. ............... 348/47 |
| 2012/0127270 | A1* | 5/2012 | Zhang et al. ............... 348/43 |
| 2012/0176380 | A1 | 7/2012 | Wang et al. |
| 2012/0249750 | A1* | 10/2012 | Izzat et al. ............... 348/47 |

OTHER PUBLICATIONS

"Super-Resolution Stereo and Multi-View Synthesis From Monocular Video Sequences" by Sebastian Knorr et al., 0/7695-2939-4/07 © 2007 IEEE.*

"Hybrid Scene Reconstruction by Integrating Scan Data and Stero Mage Pairs" by xiangying Ma et al., 0- 7695-2939-4/07 (c) 2007 IEEE.*

"Super-Resolution Stereo and Multi-View Synthesis From Monocular Video Sequences" by Sebastian Knorr et al., 0-7695-2939-4/07 © 2007 IEEE.*

"Comparative Analysis of Occlusion-Filling Techniques in Depth Image-Based Rendering for 3D Videos" by Lucio Azzari et al., Universita degli Studi Roma, Aug. 2010.*

Cao et al., "Semi-automatic 2-D-to-3-D conversion using disparity propagation," IEEE Trans. on Broadcasting, vol. 57, pp. 491-499 (2011).

Chen et al., "View interpolation for image synthesis," Proc. SIG-GRAPH '93, pp. 279-288 (1993).

Fehn, "Depth-image-based rendering (DIBR), compression, and transmission for a new approach on 3D-TV," Proc. SPIE, vol. 5291, pp. 93-104 (2004).

Fitzgibbon et al., "Image-based rendering using image-based priors," International Journal of Computer Vision, vol. 63, pp. 141-151 (2005).

Gortler et al., "The lumigraph," Proc. SIGGRAPH '96, pp. 43-54 (1996).

Guttmann et al. "Semi-automatic stereo extraction from video footage," Proc. IEEE 12th International Conference on Computer Vision, pp. 136-142 (2009).

Knorr et al., "Super-resolution stereo- and multi-view synthesis from monocular video sequences," Proc. Sixth International Conference on 3-D Digital Imaging and Modeling, pp. 55-64 (2007).

Levoy et al., "Light field rendering," Proc. SIGGRAPH '96, pp. 31-42 (1996).

Park et al., "Data-driven mean-shift belief propagation for non-Gaussian MRFs," Proc. IEEE Conference on Computer Vision and Pattern Recognition, pp. 3547-3554 (2010).

Pollefeys et al., "Visual modeling with a handheld camera," International Journal of Computer Vision, vol. 59, pp. 207-232 (2004).

Harman, "Home-based 3-D entertainment—an overview," Proc. International Conference on Image Processing, vol. 1, pp. 1-4 (2000).

Shade et al., "Layered depth images," Proc. SIGGRAPH '98, pp. 231-242 (1998).

Snavely et al., "Photo tourism: Exploring photo collections in 3-D," ACM Transactions on Graphics, vol. 25, pp. 835-846 (2006).

Gaël, "Depth maps estimation and use for 3DTV," Technical Report 0379, INRIA Rennes Bretagne Atlantique (2010).

Zhang et al., "Stereoscopic video synthesis from a monocular video," IEEE Trans. Visualization and Computer Graphics, vol. 13, pp. 686-696 (2007).

Zhang et al., "Consistent depth maps recovery from a video sequence," IEEE Trans. Pattern Analysis and Machine Intelligence, vol. 31, pp. 974-988 (2009).

Zhang et al., "3D-TV content creation: automatic 2-D-to-3-D video conversion," IEEE Trans. on Broadcasting, vol. 57, pp. 372-383 (2011).

Zitnick et al., "Stereo for image-based rendering using image over-segmentation," International Journal of Computer Vision, vol. 75, pp. 49-65 (2006).

Zitnick et al., "High-quality video view interpolation using a layered representation," ACM Transactions on Graphics vol. 23 pp. 600-608 (2004).

Lowe, "Object recognition from local scale-invariant features," Proc. International Conference on Computer Vision, vol. 2, pp. 1150-1157 1999).

Fleet et al., "Optical Flow Estimation," chapter 15 in Handbook of Mathematical Models in Computer Vision, Eds., Paragios et al., Springer (2006).

Lowe, "Distinctive image features from scale-invariant keypoints," International Journal of Computer Vision, vol. 60, pp. 91-110 (2004).

Goesele et al., "Multi-view stereo for community photo collections," Proc. International Conference on Computer Vision, pp. 1-8 (2007).

Jancosek et al., "Scalable multi-view stereo," Proc. International Conference on Computer Vision Workshops, pp. 1526-1533 (2009).

Seitz et al., "A comparison and evaluation of multi-view stereo reconstruction algorithms," Proc. Computer Vision and Pattern Recognition, vol. 1, pp. 519-528 (2006).

Gunnewick, R. Klein et al., "Coherent Spatial Temporal Occlusion Generation," Proceedings of SPIE, vol. 7237. Feb. 5, 2009, 10 pages.

International Search Report and Written Opinion for PCT/US2012/084920, mailed Jan. 25, 2013.

Lee, Cheon et al., "View Synthesis Tools for 3D Video" MPEG Meeting, No. M15851, Oct. 9, 2008, 14 pages.

Zhang, Liang et al., "3-D-TV Content Creation: Automatic 2D-to-3D Video Conversion", IEEE Trans. on Broadcasting. vol. 57, 2011, pp. 372-383.

\* cited by examiner

FORMING A STEREOSCOPIC VIDEO

CROSS-REFERENCE TO RELATED APPLICATIONS

Reference is made to commonly-assigned, co-pending U.S. patent application Ser. No. 13/004,207, entitled "Forming 3D models using periodic illumination patterns" to Kane et al.; to commonly-assigned, co-pending U.S. patent application Ser. No. 13/298,328, entitled "Range map determination for a video frame" to Wang et al.; to commonly assigned, co-pending U.S. patent application Ser. No. 13/298,332, entitled: "Modifying the viewpoint of a digital image", by Wang et al.; to commonly assigned, co-pending U.S. patent application Ser. No. 13/298,334, entitled: "Forming a stereoscopic image using range map" by Wang et al.; to commonly assigned, co-pending U.S. patent application Ser. No. 13/298,337, entitled: "Method for stabilizing a digital video", by Wang et al.; and to commonly-assigned, co-pending U.S. patent application Ser. No. 13/400,663, entitled "3D scene model from collection of images," to Wang, each of which is incorporated herein by reference.

FIELD OF THE INVENTION

This invention pertains to the field of digital imaging and more particularly to a method for determining a forming a stereoscopic video.

BACKGROUND OF THE INVENTION

Stereoscopic videos are regarded as the next prevalent media for movies, TV programs, and video games. Three-dimensional (3-D) movies, such as Avatar, Toy Story, Shrek and Thor have achieved great successes in providing extremely vivid visual experiences. The fast developments of stereoscopic display technologies and popularization of 3-D television has inspired people's desires to record their own 3-D videos and display them at home. However, professional stereoscopic recording cameras are very rare and expensive. Meanwhile, there is a great demand to perform 3-D conversion on legacy two-dimensional (2-D) videos. Unfortunately, specialized and complicated interactive 3-D conversion processes currently required, which has prevented the general public from converting captured 2-D videos to 3-D videos. Thus, it is a significant goal to develop an approach to automatically synthesize stereoscopic video from a casual monocular video.

Much research has been devoted to 2-D to 3-D conversion techniques for the purposes of generating stereoscopic videos, and significant progress has been made in this area. Fundamentally, the process of generating stereoscopic videos involves synthesizing the synchronized left and right stereo view sequences based on an original monocular view sequence. Although it is an ill-posed problem, a number of approaches have been designed to address it. Such approaches generally involve the use of human-interaction or other priors. According to the level of human assistance, these approaches can be categorized as manual, semiautomatic or automatic techniques. Manual and semiautomatic methods typically involve an enormous level of human annotation work. Automatic methods utilize extracted 3-D geometry information to synthesis new views for virtual left-eye and right-eye images.

Manual approaches typically involve manually assigning different disparity values to pixels of different objects, and then shifting these pixels horizontally by their disparities to produce a sense of parallax. Any holes generated by this shifting operation are filled manually with appropriate pixels. An example of such an approach is described by Harman in the article "Home-based 3-D entertainment—an overview" (Proc. International Conference on Image Processing, Vol., 1, pp. 1-4, 2000). These methods generally require extensive and time-consuming human interaction.

Semi-automatic approaches only require the users to manually label a sparse set of 3-D information (e.g., with user marked scribbles or strokes) for some a subset of the video frames for a given shot (e.g., the first and last video frames, or key-video frames) to obtain the dense disparity or depth map. Examples of such techniques are described by Guttmann et al. in the article "Semi-automatic stereo extraction from video footage" (Proc. IEEE 12th International Conference on Computer Vision, pp. 136-142, 2009) and by Cao et al. in the article "Semi-automatic 2-D-to-3-D conversion using disparity propagation" (IEEE Trans. on Broadcasting, Vol. 57, pp. 491-499, 2011). The 3-D information for other video frames is propagated from the manually labeled frames. However, the results may degrade significantly if the video frames in one shot are not very similar. Moreover, these methods can only apply to the simple scenes, which only have a few depth layers, such as foreground and background layers. Otherwise, extensive human annotations are still required to discriminate each depth layer.

Automatic approaches can be classified into two categories: non-geometric and geometric methods. Non-geometric methods directly render new virtual views from one nearby video frame in the monocular video sequence. One method of the type is the time-shifting approach described by Zhang et al. in the article "Stereoscopic video synthesis from a monocular video" (IEEE Trans. Visualization and Computer Graphics, Vol. 13, pp. 686-696, 2007). Such methods generally require the original video to be an over-captured images set. They also are unable to preserve the 3-D geometry information of the scene.

Geometric methods generally consists of two main steps: exploration of underline 3-D geometry information and synthesis new virtual view. For some simple scenes captured under stringent conditions, the full and accurate 3-D geometry information (e.g., a 3-D model) can be recovered as described by Pollefeys et al. in the article "Visual modeling with a handheld camera" (International Journal of Computer Vision, Vol. 59, pp. 207-232, 2004). Then, a new view can be rendered using conventional computer graphics techniques.

In most cases, only some of the 3-D geometry information can be obtained from monocular videos, such as a depth map (see: Zhang et al., "Consistent depth maps recovery from a video sequence," IEEE Trans. Pattern Analysis and Machine Intelligence, Vol. 31, pp. 974-988, 2009) or a sparse 3-D scene structure (see: Zhang et al., "3D-TV content creation: automatic 2-D-to-3-D video conversion," IEEE Trans. on Broadcasting, Vol. 57, pp. 372-383, 2011). Image-based rendering (IBR) techniques are then commonly used to synthesize new views (for example, see the article by Zitnick entitled "Stereo for image-based rendering using image over-segmentation" International Journal of Computer Vision, Vol. 75, pp. 49-65, 2006, and the article by Fehn entitled "Depth-image-based rendering (DIBR), compression, and transmission for a new approach on 3D-TV," Proc. SPIE, Vol. 5291, pp. 93-104, 2004).

With accurate geometry information, methods like light field (see: Levoy et al., "Light field rendering," Proc. SIGGRAPH '96, pp. 31-42, 1996), lumigraph (see: Gortler et al., "The lumigraph," Proc. SIGGRAPH '96, pp. 43-54, 1996), view interpolation (see: Chen et al., "View interpolation for image synthesis," Proc. SIGGRAPH '93, pp. 279-288, 1993) and layered-depth images (see: Shade et al., "Layered depth images," Proc. SIGGRAPH '98, pp. 231-242, 1998) can be used to synthesize reasonable new views by sampling and smoothing the scene. However, most IBR methods either synthesize a new view from only one original frame using little geometry information, or require accurate geometry information to fuse multiple frames.

Existing Automatic approaches unavoidably confront two key challenges. First, geometry information estimated from monocular videos are not very accurate, which can't meet the requirement for current image-based rendering (IBR) methods. Examples of IBR methods are described by Zitnick et al. in the aforementioned article "Stereo for image-based rendering using image over-segmentation," and by Fehn in the aforementioned article "Depth-image-based rendering (DIBR), compression, and transmission for a new approach on 3D-TV." Such methods synthesize new virtual views by fetching the exact corresponding pixels in other existing frames. Thus, they can only synthesize good virtual view images based on accurate pixel correspondence map between the virtual views and original frames, which needs precise 3-D geometry information (e.g., dense depth map, and accurate camera parameters). While the required 3-D geometry information can be calculated from multiple synchronized and calibrated cameras as described by Zitnick et al. in the article "High-quality video view interpolation using a layered representation" (ACM Transactions on Graphics, Vol. 23, pp. 600-608, 2004), the determination of such information from a normal monocular video is still quite error-prone.

Furthermore, the image quality that results from the synthesis of virtual views is typically degraded due to occlusion/disocclusion problems. Because of the parallax characteristics associated with different views, holes will be generated at the boundaries of occlusion/disocclusion objects when one view is warped to another view in 3-D. Lacking accurate 3-D geometry information, hole filling approaches are not able to blend information from multiple original frames. As a result, they ignore the underlying connections between frames, and generally perform smoothing-like methods to fill holes. Examples of such methods include view interpolation (See the aforementioned article by Chen et al. entitled "View interpolation for image synthesis"), extrapolation techniques (see: the aforementioned article by Cao et al. entitled "Semi-automatic 2-D-to-3-D conversion using disparity propagation") and median filter techniques (see: Knorr et al., "Super-resolution stereo- and multi-view synthesis from monocular video sequences," Proc. Sixth International Conference on 3-D Digital Imaging and Modeling, pp. 55-64, 2007). Theoretically, these methods cannot obtain the exact information for the missing pixels from other frames, and thus it is difficult to fill the holes correctly. In practice, the boundaries of occlusion/disocclusion objects will be blurred greatly, which will thus degrade the visual experience.

SUMMARY OF THE INVENTION

The present invention represents a method for forming a stereoscopic video of a scene, the stereoscopic video having a time sequence of stereoscopic video frames, each stereoscopic video frame including a first-eye image and a second-eye image, comprising:

receiving first and second input digital videos including overlapping scene content captured using respective first and second digital video cameras, each input digital video including a temporal sequence of video frames, wherein the first and second input digital videos have overlapping time durations and are captured from different camera positions;

defining a time interval for the stereoscopic video corresponding to some or all of the overlapping portion of the time durations;

determining camera positions for each video frame of the first and second input digital videos within the defined time interval providing an indication of the position of the respective digital video camera;

determining first-eye and second-eye stereoscopic viewpoints for each stereoscopic video frame of the stereoscopic video;

for each stereoscopic video frame forming the first-eye and second-eye images corresponding respectively to the first-eye and second-eye stereoscopic viewpoints responsive to corresponding video frames in the first and second input digital videos and the associated camera positions; and storing the stereoscopic video in a processor-accessible memory;

wherein the method is implemented at least in part by a data processing system.

This invention has the advantage that the stereoscopic video is formed without the use of a special-purpose stereoscopic video camera.

It has the additional advantage that a user can form a stereoscopic video captured of an event using a conventional two-dimensional input video by using a shared video from another person captured at the same event, or by identifying one or more additional digital videos in a collection of digital videos captured with an overlapping time duration and including overlapping scene content.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
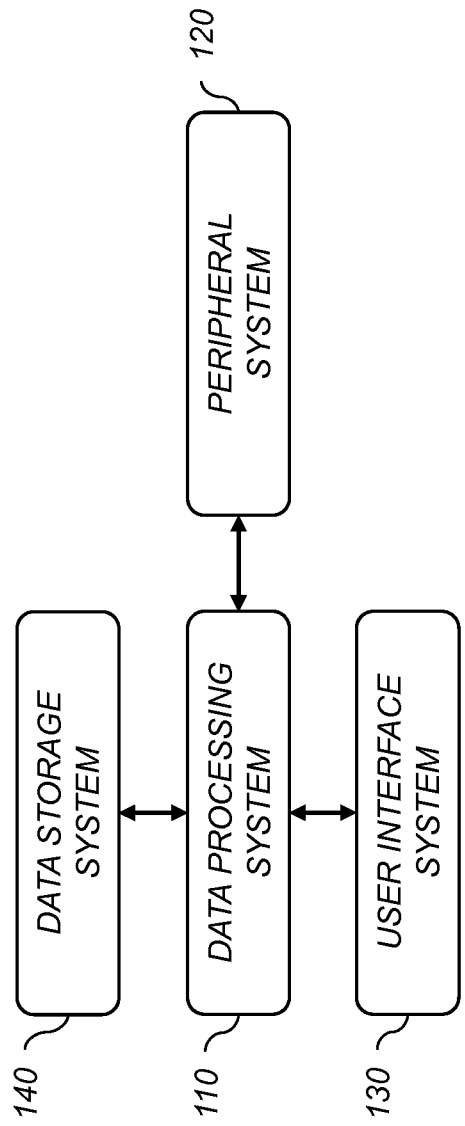
FIG. 1 is a high-level diagram showing the components of a system for processing digital images according to an embodiment of the present invention.

FIG. 1 is a high-level diagram showing the components of a system for processing digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

As discussed in the background of the invention, one of the problems in synthesizing a new view of an image are holes that result from occlusions when an image frame is warped to form the new view. Fortunately, a particular object generally shows up in a series of consecutive video frames in a continuously captured video. As a result, a particular 3-D point in the scene will generally be captured in several consecutive video frames with similar color appearances. To get a high quality synthesized new view, the missing information for the holes can therefore be found in other video frames. The pixel correspondences between adjacent frames can be used to form a color consistency constraint. Thus, various 3-D geometric cures can be integrated to eliminate ambiguity in the pixel correspondences. Accordingly, it is possible to synthesize a new virtual view accurately even using error-prone 3-D geometry information.

In accordance with the present invention a method is described to automatically generate stereoscopic videos from casual monocular videos. In one embodiment three main processes are used. First, a structure-from-motion algorithm such as that described Snavely et al. in the article entitled "Photo tourism: Exploring photo collections in 3-D" (ACM Transactions on Graphics, Vol. 25, pp. 835-846, 2006) is employed to estimate the camera parameters for each frame and the sparse point clouds of the scene. Next, an efficient dense disparity/depth map recovery approach is implemented which leverages aspects of the fast mean-shift belief propagation proposed by Park et al., in the article "Data-driven mean-shift belief propagation for non-Gaussian MRFs" (Proc. IEEE Conference on Computer Vision and Pattern Recognition, pp. 3547-3554, 2010). Finally, new virtual views synthesis is used to form left-eye/right-eye video frame sequences. Since previous works require either accurate 3-D geometry information to perform image-based rendering, or simply interpolate or copy from neighborhood pixels, satisfactory new view images have been difficult to generate. The present method uses a color consistency prior based on the assumption that 3-D points in the scene will show up in several consecutive video frames with similar color texture. Additionally, another prior is used based on the assumption that the synthesized images should be as smooth as a natural image. These priors can be used to eliminate ambiguous geometry information, and improve the quality of synthesized image. A Bayesian-based view synthesis algorithm is described that incorporates estimated camera parameters and dense depth maps of several consecutive frames to synthesize a nearby virtual view image.

Figure 2:
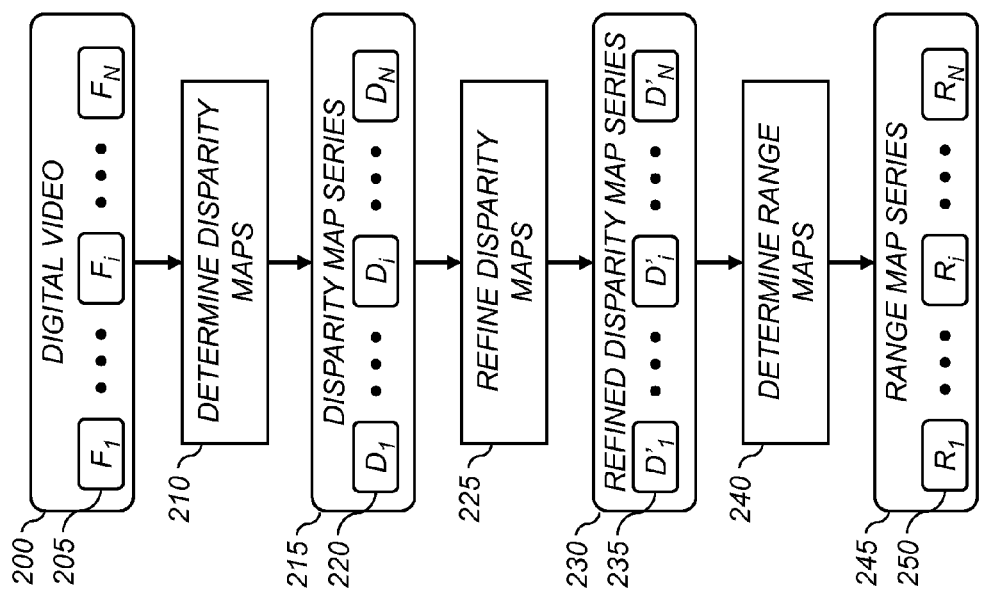
FIG. 2 is a flow chart illustrating a method for determining range maps for frames of a digital video.

Aspects of the present invention will now be described with reference to FIG. 2 which shows a flow chart illustrating a method for determining range maps 250 for video frames 205 ($F_1$-$F_N$) of a digital video 200. The range maps 250 are useful for a variety of different applications including performing various image analysis and image understanding processes, forming warped video frames corresponding to different viewpoints, forming stabilized digital videos and forming stereoscopic videos from monoscopic videos. Table 1 defines notation that will be used in the description of the present invention.

TABLE 1

| | Notation |
|---|---|
| $F_i$ | Input video frame sequence, i = 1 to N |
| $C_i$ | Estimated camera parameters for $F_i$ (includes both intrinsic and extrinsic camera parameters) |
| $R_i$ | Range map for $F_i$ |
| $V_T$ | target viewpoint |
| $SF_v$ | Synthesized frame for target viewpoint $V_T$ |
| (x; y) | Subscript, which indicates the pixel location in an image or a depth map (e.g., $F_{i, (x, y)}$ refers the pixel at coordinate (x, y) in frame $F_i$, and $R_{i, (x, y)}$ is the corresponding depth value) |
| fC(W, F) | shows the pixel correspondences from a warped frame W to the original frame F. (e.g., fC($SF_v$, $F_i$) shows the correspondence map from $SF_v$ to $F_i$, and fC($SF_{v, (x, y)}$, $F_i$) indicates the corresponding pixel in $F_i$ for $SF_{v, (x, y)}$) |

A determine disparity maps step 210 is used to determine a disparity map series 215 including a disparity map 220 ($D_1$-$D_N$) corresponding to each of the video frames 205. Each disparity map 220 is a 2-D array of disparity values that provide an indication of the disparity between the pixels in the corresponding video frame 205 and a second video frame selected from the digital video 200. In a preferred embodiment, the second video frame is selected from a set of candidate frames according to a set of criteria that includes an image similarity criterion and a position difference criterion. The disparity map series 215 can be determined using any method known in the art. A preferred embodiment of the determine disparity maps step 210 will be described later with respect to FIG. 3.

The disparity maps 220 will commonly contain various artifacts due to inaccuracies introduced by the determine disparity maps step 210. A refine disparity maps step 225 is used to determine a refined disparity map series 230 that includes refined disparity maps 235 ($D'_1$-$D'_N$). In a preferred embodiment, the refine disparity maps step 225 applies two processing stages. A first processing stage using an image segmentation algorithm to provide spatially smooth the disparity values, and a second processing stage applies a temporal smoothing operation.

For the first processing stage of the refine disparity maps step 225, an image segmentation algorithm is used to identify contiguous image regions (i.e., clusters) having image pixels with similar color and disparity. The disparity values are then smoothed within each of the clusters. In a preferred embodiment, the disparities are smoothed by determining a mean disparity value for each of the clusters, and then updating the disparity value assigned to each of the pixels in the cluster to be equal to the mean disparity value. In one embodiment, the clusters are determined using the method described with respect to FIG. 3 in commonly-assigned U.S. Patent Application Publication 2011/0026764 to Wang, entitled "Detection of objects using range information," which is incorporated herein by reference.

For the second processing stage of the refine disparity maps step 225, the disparity values are temporally smoothed across a set of video frames 205 surrounding the particular video frame $F_i$. Using approximately 3 to 5 video frames 205 before and after the particular video frame $F_i$ have been found to produce good results. For each video frame 205, motion vectors are determined that relate the pixel positions in that video frame 205 to the corresponding pixel position in the particular video frame $F_i$. For each of the clusters of image pixels determined in the first processing stage, corresponding cluster positions in the other video frames 205 are determined using the motion vectors. The average of the disparity values determined for the corresponding clusters in the set of video frames are then averaged to determine the refined disparity values for the refined disparity map 235.

Finally, a determine range maps step 240 is used to determine a range map series 245 that includes a range map 250 ($R_1$-$R_N$) that corresponds to each of the video frames 205. The range maps 250 are a 2-D array of range values representing a "range" (e.g., a "depth" from the camera to the scene) for each pixel in the corresponding video frames 205. The range values can be calculated by triangulation from the disparity values in the corresponding disparity map 220 given a knowledge of the camera positions (including a 3-D location and a pointing direction determined from the extrinsic parameters) and the image magnification (determined from the intrinsic parameters) for the two video frames 205 that were used to determine the disparity maps 220. Methods for determining the range values by triangulation are well-known in the art.

The camera positions used to determine the range values can be determined in a variety of ways. As will be discussed in more detail later with respect to FIG. 3, methods for determining the camera positions include the use of position sensors in the digital camera, and the automatic analysis of the video frames 205 to estimate the camera positions based on the motion of image content within the video frames 205.

Figure 3:
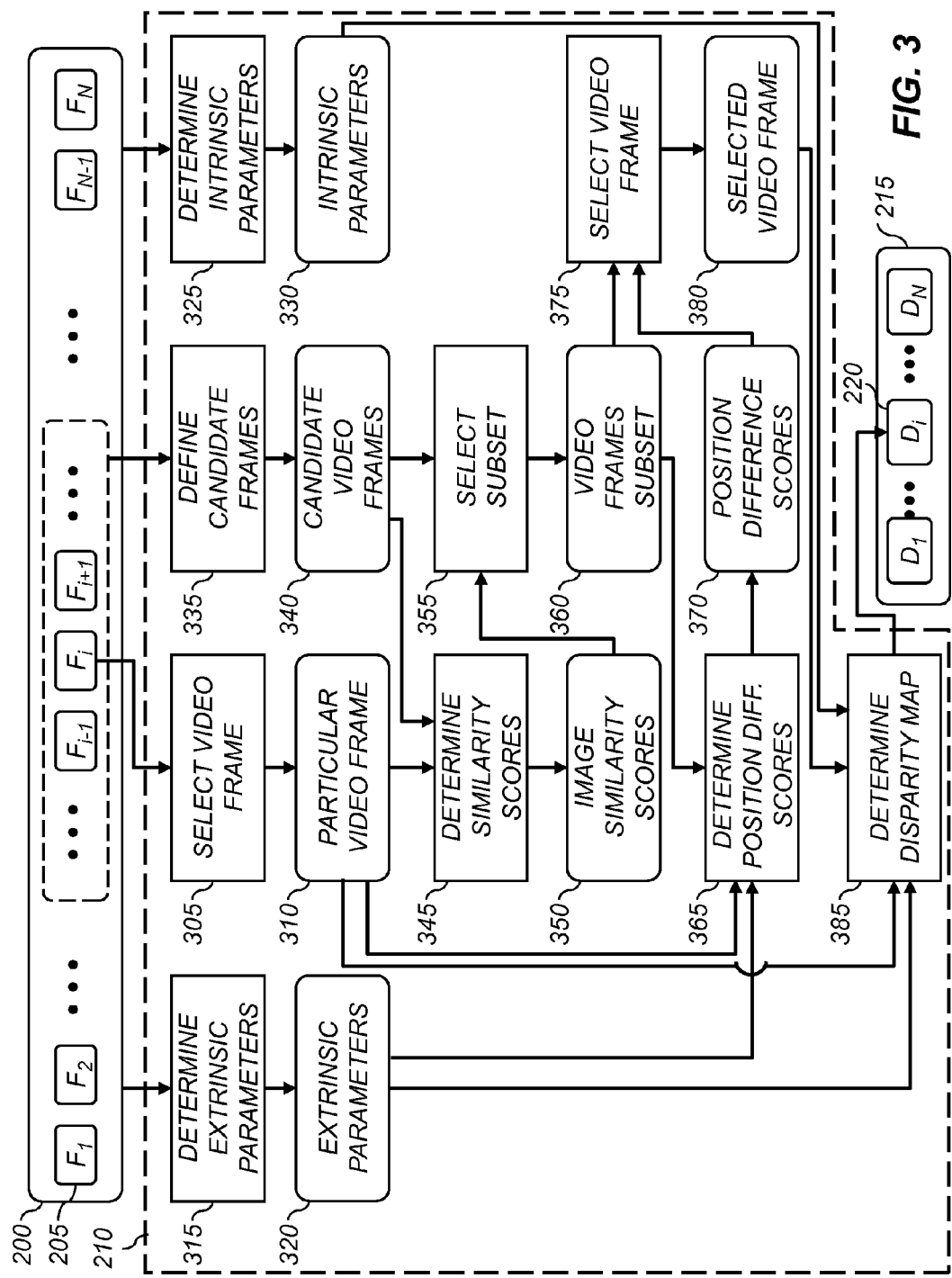
FIG. 3 is a flowchart showing additional details for the determine disparity maps step of FIG. 2.

FIG. 3 shows a flowchart showing additional details of the determine disparity maps step 210 according to a preferred embodiment. The input digital video 200 includes a temporal sequence of video frames 205. In the illustrated example, a disparity map 220 ($D_i$) is determined corresponding to a particular input video frame 205 ($F_i$). This process can be repeated for each of the video frames 205 to determine each of the disparity maps 220 the disparity map series 215.

A select video frame step 305 is used to select a particular video frame 310 (in this example the $i^{th}$ video frame $F_i$). A define candidate video frames step 335 is used to define a set of candidate video frames 340 from which a second video frame will be selected that is appropriate for forming a stereo image pair. The candidate video frames 340 will generally include a set of frames that occur near to the particular video frame 310 in the sequence of video frames 205. For example, the candidate video frames 340 can include all of the neighboring video frames that occur within a predefined interval of the particular video frame (e.g., +/−10 to 20 frames). In some embodiments, only a subset of the neighboring video frames are included in the set of candidate video frames 340 (e.g., every second frame or every tenth frame). This can enable including candidate video frames 340 that span a larger time interval of the digital video 200 without requiring the analysis of an excessive number of candidate video frames 340.

A determine intrinsic parameters step 325 is used to determine intrinsic parameters 330 for each video frame 205. The intrinsic parameters are related to a magnification of the video frames. In some embodiments, the intrinsic parameters are determined responsive to metadata indicating the optical configuration of the digital camera during the image capture process. For example, in some embodiments, the digital camera has a zoom lens and the intrinsic parameters include a lens focal length setting that is recorded during the capturing the of digital video 200. Some digital cameras also include a "digital zoom" capability whereby the captured images are cropped to provide further magnification. This effectively extends the "focal length" range of the digital camera. There are various ways that intrinsic parameters can be defined to represent the magnification. For example, the focal length can be recorded directly. Alternately, a magnification factor relative to reference focal length, or an angular extent can be recorded. In other embodiments, the intrinsic parameters 330 can be determined by analyzing the digital video 200. For example, as will be discussed in more detail later, the intrinsic parameters 330 can be determined using a "structure-from-motion" (SFM) algorithm.

A determine extrinsic parameters step 315 is used to analyze the digital video 200 to determine a set of extrinsic parameters 320 corresponding to each video frame 205. The extrinsic parameters provide an indication of the camera position of the digital camera that was used to capture the digital video 200. The camera position includes both a 3-D camera location and a pointing direction (i.e., an orientation) of the digital camera. In a preferred embodiment, the extrinsic parameters 320 include a translation vector ($T_i$) which specifies the 3-D camera location relative to a reference location and a rotation matrix ($M_i$) which relates to the pointing direction of the digital camera.

The determine extrinsic parameters step 315 can be performed using any method known in the art. In some embodiments, the digital camera used to capture the digital video 200 may include position sensors (location sensors and orientation sensors) that directly sense the position of the digital camera (either as an absolute camera position or a relative camera position) at the time that the digital video 200 was captured. The sensed camera position information can then be stored as metadata associated with the video frames 205 in the file used to store the digital video 200. Types of position sensors used in digital cameras commonly include gyroscopes, accelerometers and global positioning system (GPS) sensors.

In other embodiments, the camera positions can be estimated by analyzing the digital video 200. In a preferred embodiment, the camera positions can be determined using a so called "structure-from-motion" (SFM) algorithm (or some other type of "camera calibration" algorithm). SFM algorithms are used in the art to extract 3-D geometry information from a set of 2-D images of an object or a scene. The 2-D images can be consecutive frames taken from a video, or pictures taken with an ordinary camera from different directions. In accordance with the present invention, an SFM algorithm can be used to recover the camera intrinsic parameters 330 and extrinsic parameters 320 for each video frame 205. Such algorithms can also be used to reconstruct 3-D sparse point clouds. The most common SFM algorithms involve key-point detection and matching, forming consistent matching tracks and solving camera parameters.

An example of an SFM algorithm that can be used to determine the intrinsic parameters 330 and the extrinsic parameters 320 in accordance with the present invention is described in the aforementioned article by Snavely et al. entitled "Photo tourism: Exploring photo collections in 3-D." In a preferred embodiment, two modifications to the basic algorithms are made. 1) Since the input are an ordered set of 2-D video frames 205, key-points from only certain neighborhood frames are matched to save computational cost. 2) To guarantee enough baselines and reduce the numerical errors in solving camera parameters, some key-frames are eliminated according to an elimination criterion. The elimination criterion is to guarantee large baselines and a large number of matching points between two consecutive key frames. The camera parameters for these key-frames are used as initial values for a second run using the entire sequence of video frames 205.

A determine similarity scores step 345 is used to determine image similarity scores 350 providing an indication of the similarity between the particular video frame 310 and each of the candidate video frames. In some embodiments, larger image similarity scores 350 correspond to a higher degree of image similarity. In other embodiments, the image similarity scores 350 are representations of image differences. In such cases, smaller image similarity scores 350 correspond to smaller image differences, and therefore to a higher degree of image similarity.

Any method for determining image similarity scores 350 known in the art can be used in accordance with the present invention. In a preferred embodiment, the image similarity score 350 for a pair of video frames is computed by determining SIFT features for the two video frames, and determining the number of matching SIFT features that are common to the two video frames. Matching SIFT features are defined to be those that are similar to within a predefined difference. In some embodiments, the image similarity score 350 is simply set to be equal to the number of matching SIFT features. In other embodiments, the image similarity score 350 can be determined using a function that is responsive to the number of matching SIFT features. The determination of SIFT features are well-known in the image processing art. In a preferred embodiment, the SIFT features are determined and matched using methods described by Lowe in the article entitled "Object recognition from local scale-invariant features" (Proc. International Conference on Computer Vision, Vol. 2, pp. 1150-1157, 1999), which is incorporated herein by reference.

A select subset step 355 is used to determine a subset of the candidate video frames 340 that have a high degree of similarity to the particular video frame, thereby providing a video frames subset 360. In a preferred embodiment, the image similarity scores 350 are compared to a predefined threshold (e.g., 200) to select the video frame subset. In cases where larger image similarity scores 350 correspond to a higher degree of image similarity, those candidate video frames 340 having image similarity scores 350 that exceed the predefined threshold are included in the video frames subset 360. In cases where smaller image similarity scores 350 correspond to a higher degree of image similarity, those candidate video frames 340 having image similarity scores that are less than the predefined threshold are included in the video frames subset 360. In some embodiments, the threshold is determined adaptively based on the distribution of image similarity scores. For example, the threshold can be set so that a predefined number of candidate video frames 340 having the highest degree of image similarity with the particular video frame 310 are included in the video frames subset 360.

Next, a determine position difference scores step 365 is used to determine position difference scores 370 relating to differences between the positions of the digital video camera for the video frames in the video frames subset 360 and the particular video frame 310. In a preferred embodiment, the position difference scores are determined responsive to the extrinsic parameters 320 associated with the corresponding video frames.

The position difference scores 370 can be determined using any method known in the art. In a preferred embodiment, the position difference scores include a location term as well as an angular term. The location term is proportional to a Euclidean distance between the camera locations for the two video frames ($D_L = ((x_2-x_1)^2+(y_2-y_1)^2+(z_2-z_1)^2)^{0.5}$, where ($x_1, y_1, z_1$) and ($x_2, y_2, z_2$) are the camera locations for the two frames). The angular term is proportional to the angular change in the camera pointing direction for the two video frames ($D_A = \arccos(P_1 \cdot P_2/|P_1 \cdot P_2|)$, where $P_1$ and $P_2$ are pointing direction vectors for the two video frames). The location term and the angular term can then be combined using a weighted average to determine the position difference scores 370. In other embodiments, the "3D quality criterion" described by Gaël in the technical report entitled "Depth maps estimation and use for 3DTV" (Technical Report 0379, INRIA Rennes Bretagne Atlantique, 2010) can be used as the position difference scores 370.

A select video frame step 375 is used to select a selected video frame 38 from the video frames subset 360 responsive to the position difference scores 370. It is generally easier to determine disparity values from image pairs having larger camera location differences. In a preferred embodiment, the select video frame step 375 selects the video frame in the video frames subset 360 having the largest position difference. This provides the selected video frame 380 having the largest degree of disparity relative to the particular video frame 310.

A determine disparity map step 385 is used to determine the disparity map 220 ($D_i$) having disparity values for an array of pixel locations by automatically analyzing the particular video frame 310 and the selected video frame 380. The disparity values represent a displacement between the image pixels in the particular video frame 310 and corresponding image pixels in the selected video frame 380.

The determine disparity map step 385 can use any method known in the art for determining a disparity map 220 from a stereo image pair can be used in accordance with the present invention. In a preferred embodiment, the disparity map 220 is determined by using an "optical flow algorithm" to determine corresponding points in the stereo image pair. Optical flow algorithms are well-known in the art. In some embodiments, the optical flow estimation algorithm described by Fleet et al. in the book chapter "Optical Flow Estimation" (chapter 15 in Handbook of Mathematical Models in Computer Vision, Eds., Paragios et al., Springer, 2006) can be used to determine the corresponding points. The disparity values to populate the disparity map 220 are then given by the Euclidean distance between the pixel locations for the corresponding points in the stereo image pair. An interpolation operation can be used to fill any holes in the resulting disparity map 220 (e.g., corresponding to occlusions in the stereo image pair). In some embodiments, a smoothing operation can be used to reduce noise in the estimated disparity values.

While the method for determining the disparity map 220 in the method of FIG. 3 was described with reference to a set of video frames 205 for a digital video 200, one skilled in the art will recognize that it can also be applied to determining a range map for a digital still image of a scene. In this case, the digital still image is used for the particular video frame 310, and a set of complementary digital still images of the same scene captured from different viewpoints are used for the candidate video frames 340. The complementary digital still images can be images captured by the same digital camera (where it is repositioned to change the viewpoint), or can even be captured by different digital cameras.

Figure 4:
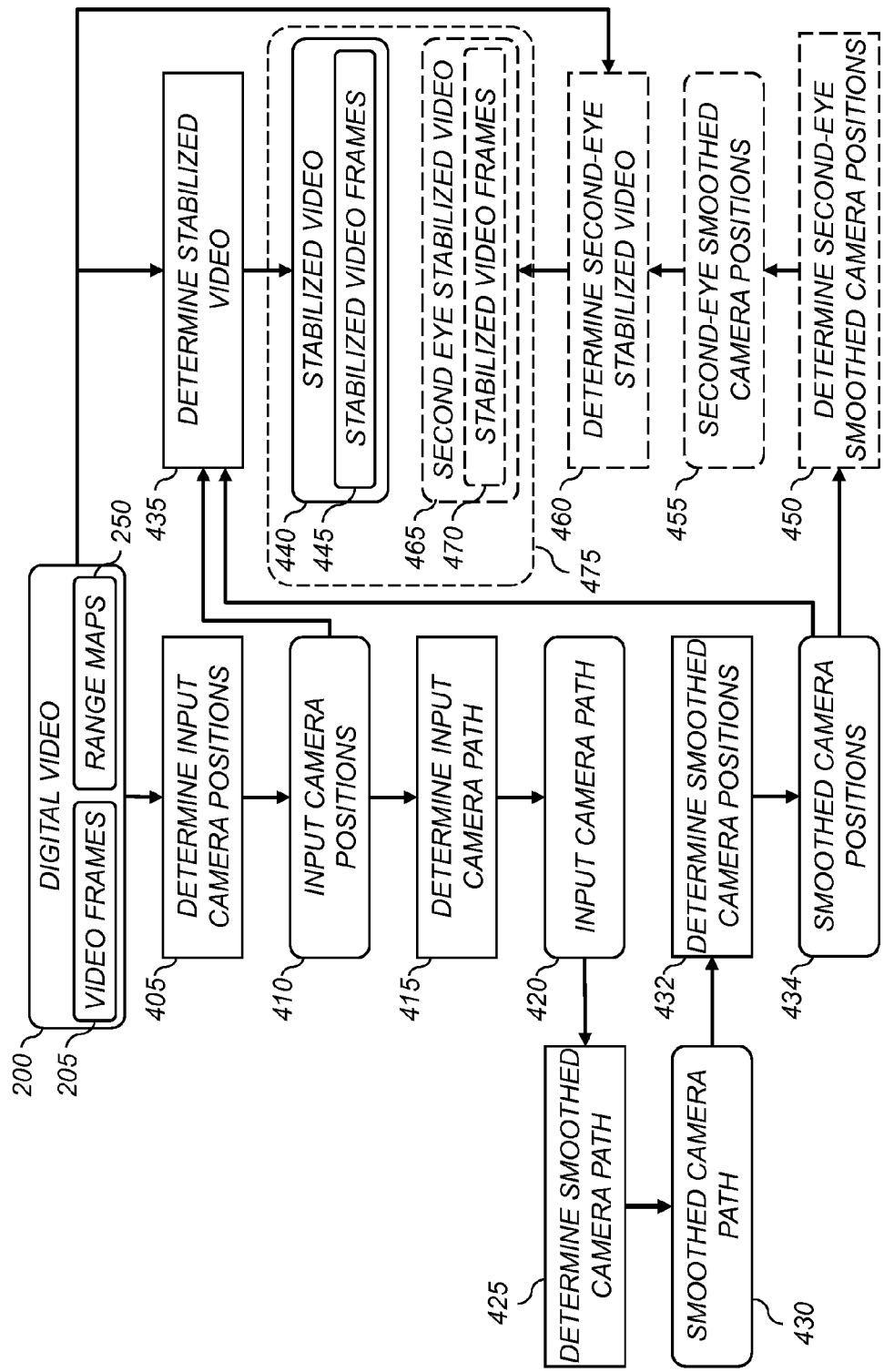
FIG. 4 is a flowchart of a method for determining a stabilized video from an input digital video.

FIG. 4 shows a flowchart of a method for determining a stabilized video 440 from an input digital video 200 that includes a sequence of video frames 205 and corresponding range maps 250. In a preferred embodiment, the range maps 250 are determined using the method that was described above with respect to FIGS. 2 and 3. A determine input camera positions step 405 is used to determine input camera positions 410 for each video frame 205 in the digital video 200. In a preferred embodiment, the input camera positions 410 include both 3-D locations and pointing directions of the digital camera. As was discussed earlier with respect to the determine extrinsic parameters step 315 in FIG. 3, there are a variety of ways that camera positions can be determined. Such methods include directly measuring the camera positions using position sensors in the digital camera, and using an automatic algorithm (e.g., a structure-from-motion algorithm) to estimate the camera positions by analyzing the video frames 205.

Figure 5:
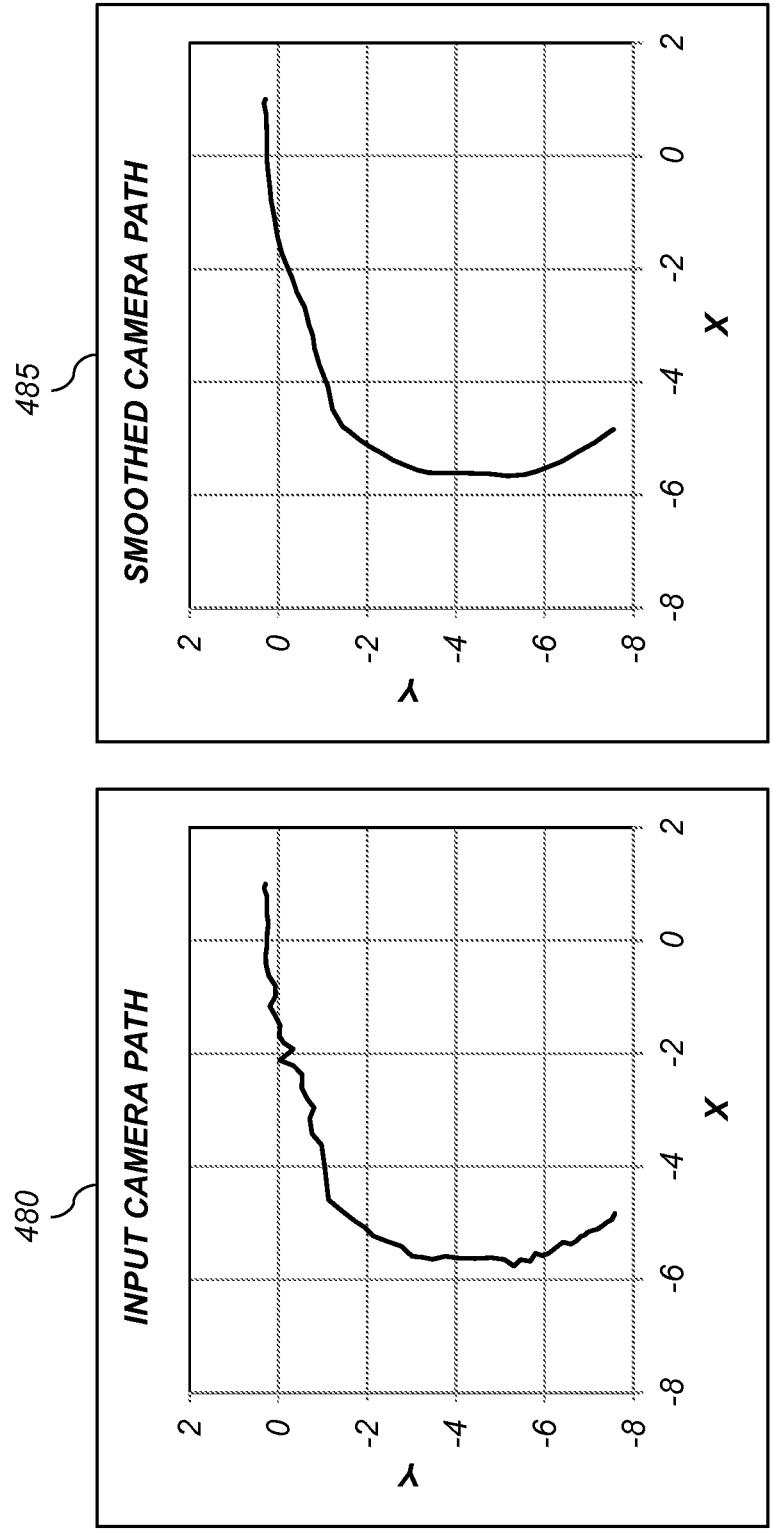
FIG. 5 shows a graph of a smoothed camera path.

A determine input camera path step 415 is used to determine an input camera path 420 for the digital video 200. In a preferred embodiment, the input camera path 420 is a look-up table (LUT) specifying the input camera positions 410 as a function of a video frame index. FIG. 5 shows an example of an input camera path graph 480 showing a plot showing two dimensions of the input camera path 420 (i.e., the x-coordinate and the y-coordinate of the 3-D camera location). Similar plots could be made for the other dimension of the 3-D camera location, as well as the dimensions of the camera pointing direction.

Returning to a discussion of FIG. 4, a determine smoothed camera path step 425 is used to determine a smoothed camera path 430 by applying a smoothing operation to the input camera path 420. Any type of smoothing operation known in the art can be used to determine the smoothed camera path 430. In a preferred embodiment, the smoothed camera path 430 is determined by fitting a smoothing spline (e.g., a cubic spline having a set of knot points) to the input camera path 420. Smoothing splines are well-known in the art. The smoothness of the smoothed camera path 430 can typically be controlled by adjusting the number of knot points in the smoothing spline. In other embodiments, the smoothed camera path 430 can be determined by convolving the LUT for each dimension of the input camera path 420 with a smoothing filter (e.g., a low-pass filter). FIG. 5 shows an example of a smoothed camera path graph 485 that was formed by applying a smoothing spline to the input camera path 420 corresponding to the input camera path graph 480.

In some embodiments random variations can be added to the smoothed camera path 430 so that the stabilized video 440 retains a "hand-held" look. The characteristics (amplitude and temporal frequency content) of the random variations are preferably selected to be typical of high-quality consumer videos.

In some embodiments, a user interface can be provided to enable a user to adjust the smoothed camera path 430. For example, the user can be enabled to specify modifications to the camera location, the camera pointing direction and the magnification as a function of time.

A determine smoothed camera positions step 432 is used to determine smoothed camera positions 434. The smoothed camera positions 434 will be used to synthesize a series of stabilized video frames 445 for a stabilized video 440. In a preferred embodiment, the smoothed camera positions 434 are determined by uniformly sampling the smoothed camera path 430. For the case where the smoothed camera path 430 is represented using a smoothed camera position LUT, the individual LUT entries can each be taken to be smoothed camera positions 434 for corresponding stabilized video frames 445. For the case where the smoothed camera path 430 is represented using a spline representation, the spline function can be sampled to determine the smoothed camera positions 434 for each of the stabilized video frames 445.

A determine stabilized video step 435 is used to determine a sequence of stabilized video frames 445 for the stabilized video 440. The stabilized video frames 445 are determined by modifying the video frames 205 in the input digital video 200 to synthesize new views of the scene having viewpoints corresponding to the smoothed camera positions 434. In a preferred embodiment, each stabilized video frame 445 is determined by modifying the video frame 205 having the input camera position that is nearest to the desired smoothed camera position 434.

Any method for modifying the viewpoint of a digital image known in the art can be used in accordance with the present invention. In a preferred embodiment, the determine stabilized video step 435 synthesizes the stabilized video frames 445 using the method that is described below with respect to FIG. 6.

In some embodiments, an input magnification value for each of the input video frames 205 in addition to the input camera positions 410. The input magnification values are related to the zoom setting of the digital video camera. Smoothed magnification values can then be determined for each stabilized video frame 445. The smoothed magnification values provide smoother transitions in the image magnification. The magnification of each stabilized video frame 445 is then adjusted according to the corresponding smoothed magnification value.

In some applications, it is desirable to form a stereoscopic video from a monocular input video. The above-described method can easily be extended to produce a stabilized stereoscopic video 475 using a series of optional steps (shown with dashed outline). The stabilized stereoscopic video 475 includes two complete videos, one corresponding to each eye of an observer. The stabilized video 440 is displayed to one eye of the observer, while a second-eye stabilized video 465 is displayed to the second eye of the observer. Any method for displaying stereoscopic videos known in the art can be used to display the stabilized stereoscopic video 475. For example, the two videos can be projected onto a screen using light having orthogonal polarizations. The observer can then view the screen using glasses having corresponding polarizing filters for each eye.

To determine the second-eye stabilized video 465, a determine second-eye smoothed camera positions 450 is used to determine second-eye smoothed camera positions 455. In a preferred embodiment, the second-eye smoothed camera positions 455 have the same pointing directions as the corresponding smoothed camera positions 434, and the camera location is shifted laterally relative to the pointing direction by a predefined spatial increment. To form a stabilized stereoscopic video 475 having realistic depth, the predefined spatial increment should correspond to the distance between the left and right eyes of a typical observer (i.e., about 6-7 cm). The amount of depth perception can be increased or decreased by adjusting the size of the spatial increment accordingly.

A determine second-eye stabilized video step 460 is used to form the stabilized video frames 470 by modifying the video frames 205 in the input digital video 200 to synthesize new views of the scene having viewpoints corresponding to the second-eye smoothed camera positions 455. This step uses an identical process to that used by the determine stabilized video step 435.

Figure 6:
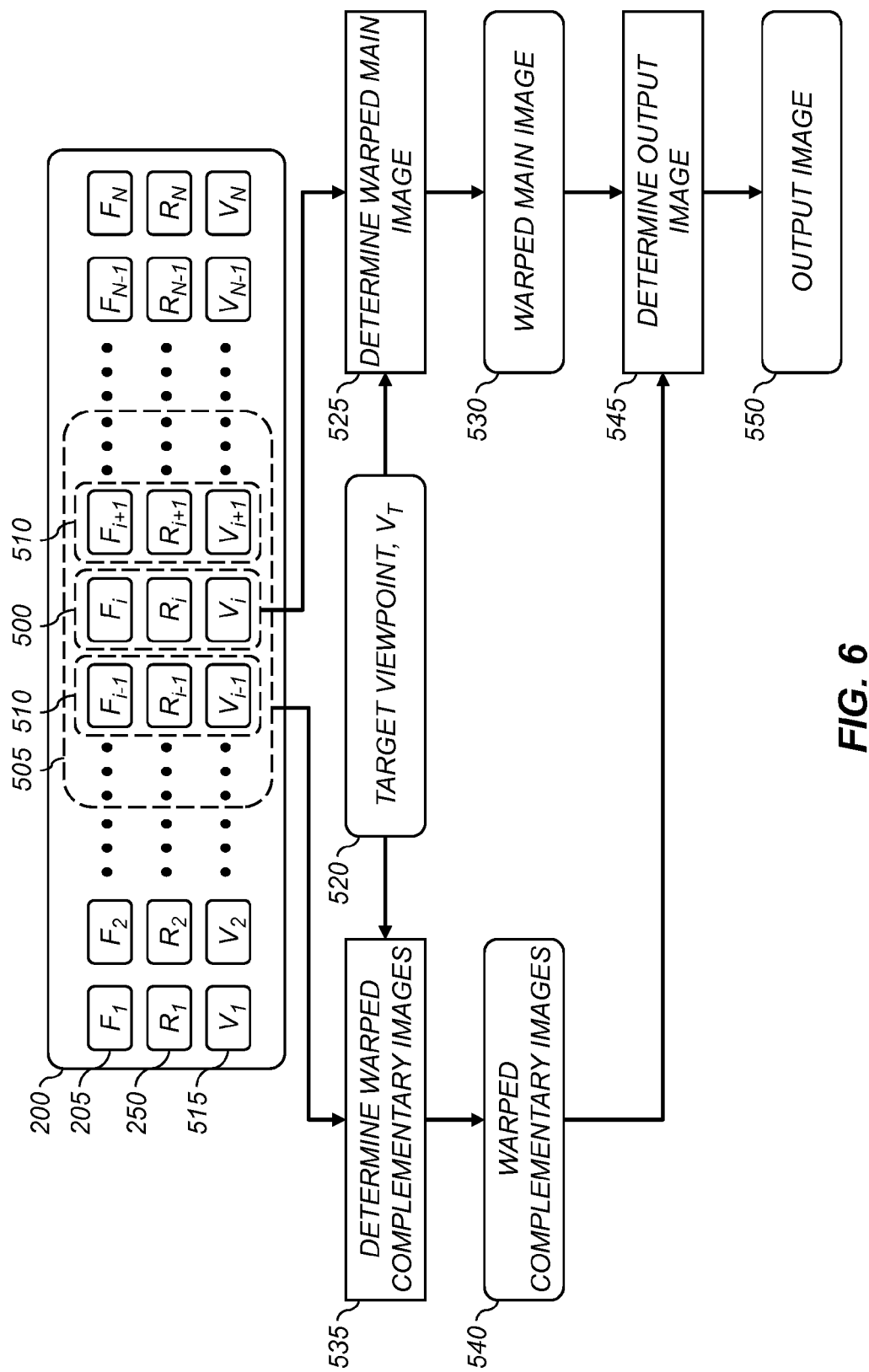
FIG. 6 is a flow chart of a method for modifying the viewpoint of a main image of a scene.

FIG. 6 shows a flow chart of a method for modifying the viewpoint of a main image 500 of a scene captured from a first viewpoint ($V_i$). The method makes use of a set of complementary images 505 of the scene including one or more complementary images 510 captured from viewpoints that are different from the first viewpoint. This method can be used to perform the determine stabilized video step 435 and the determine second-eye stabilized video step 460 discussed earlier with respect to FIG. 4.

In the illustrated embodiment, the main image 500 corresponds to a particular image frame ($F_i$) from a digital video 200 that includes a time sequence of video frames 205 ($F_1$-$F_N$). Each video frame 205 is captured from a corresponding viewpoint 515 ($V_1$-$V_N$) and has an associated range map 250 ($R_1$-$R_N$). The range maps 250 can be determined using any method known in the art. In a preferred embodiment, the range maps 250 are determined using the method described earlier with respect to FIGS. 2 and 3.

The set of complementary images 505 includes one or more complementary image 510 corresponding to image frames that are close to the main image 500 in the sequence of video frames 205. In one embodiment, the complementary images 510 include one or both of the image frames that immediately precede and follow the main image 500. In other embodiments, the complementary images can be the image frames occurring a fixed number frames away from the main image 500 (e.g., 5 frames). In other embodiments, the complementary images 510 can include more than two image frames (e.g., video frames $F_{i-10}$, $F_{i-5}$, $F_{i+5}$ and $F_{i+10}$). In some embodiments, the image frames that are selected to be complementary images 510 are determined based on their viewpoints 515 to ensure that they have a sufficiently different viewpoints from the main image 500.

A target viewpoint 520 ($V_T$) is specified, which is to be used to determine a synthesized output image 550 of the scene. A determine warped main image step 525 is used to determine a warped main image 530 from the main image 500. The warped main image 530 corresponds to an estimate of the image of the scene that would have been captured from the target viewpoint 520. In a preferred embodiment the determine warped main image step 525 uses a pixel-level depth-based projection algorithm; such algorithms are well-known in the art and generally involve using a range map that provides depth information. Frequently, the warped main image 530 will include one or more "holes" corresponding to scene content that was occluded in the main image 500, but would be visible from the target viewpoint.

The determine warped main image step 525 can use any method for warping an input image to simulate a new viewpoint that is known in the art. In a preferred embodiment, the determine warped main image step 525 uses a Bayesian-based view synthesis approach as will be described below.

Similarly, a determine warped complementary images step 535 is used to determine a set of warped complementary images 540 corresponding again to the target viewpoint 520. In a preferred embodiment, the warped complementary images 540 are determined using the same method that was used by the determine warped main image step 525. The warped complementary images 540 will be have the same viewpoint as the warped main image 530, and will be spatially aligned with the warped main image 530. If the complementary images 510 have been chosen appropriately, one or more of the warped complementary images 540 will contain image content in the image regions corresponding to the holes in the warped main image 530. A determine output image step 545 is used to determine an output image 550 by combining the warped main image 530 and the warped complementary images 540. In a preferred embodiment, the determine output image step 545 determines pixel values for each of the image pixels in the one or more holes in the warped main image 530 using pixel values at corresponding pixel locations in the warped complementary images 540.

In some embodiments, the pixel values of the output image 550 are simply copied from the corresponding pixels in the warped main image 530. Any holes in the warped main image 530 can be filled by copying pixel values from corresponding pixels in one of the warped complementary images 540. In other embodiments, the pixel values of the output image 550 are determined by forming a weighted combination of corresponding pixels in the warped main image 530 and the warped complementary images 540. For cases where the warped main image 530 or one or more of the warped complementary images 540 have holes, only pixels values from pixels that are not in (or near) holes should preferably be included in the weighted combination. In some embodiments, only output pixels that are in (or near) holes in the warped main image 530 are determined using the weighted combination. As will be described later, in a preferred embodiment, pixel values for the output image 550 are determined using the Bayesian-based view synthesis approach.

While the method for warping the main image 500 to determine the output image 550 with a modified viewpoint was described with reference to a set of video frames 205 for a digital video 200, one skilled in the art will recognize that it can also be applied to adjust the viewpoint of a main image that is a digital still image captured with a digital still camera. In this case, the complementary images 510 are images of the same scene captured from different viewpoints. The complementary images 510 can be images captured by the same digital still camera (where it is repositioned to change the viewpoint), or can even be captured by different digital still cameras.

A Bayesian-based view synthesis approach that can be used to simultaneously perform the determine warped main image step 525, the determine warped complementary images step 535, and the determine output image step 545 according to a preferred embodiment will now be described. Given a sequence of video frames 205 $F_i$ (i=1–N), together with corresponding range information $R_i$ and camera parameters $C_i$ that specify the camera viewpoints $V_i$, the goal is to synthesize the output image 550 ($SF_v$) at the specified target viewpoint 520 ($V_T$). The camera parameters for frame i can be denoted as $C_i = \{K_i, M_i, T_i\}$, where $K_i$ is a matrix including intrinsic camera parameters (e.g., parameters related to the lens magnification), and $M_i$ and $T_i$ are extrinsic camera parameters specifying a camera position. In particular, $M_i$ is a rotation matrix and $T_i$ is a translation vector, which specify a change in camera pointing direction and camera location, respectively, relative to a reference camera position. Taken together, $M_i$ and $T_i$ define the viewpoint $V_i$ for the video frame $F_i$. The range map $R_i$ provides information about a third dimension for video frame $F_i$, indicating the "z" coordinate (i.e., "range" or "depth") for each (x,y) pixel location and thereby providing 3-D coordinates relative to the camera coordinate system.

It can be shown that the pixels in one image frame (with known camera parameters and range map) can be mapped to corresponding pixel positions in another virtual view using the following geometric relationship:

$$p_v = R_i(p_i) K_v M_v^T M_i K_i^{-1} p_i + K_v M_v^T (T_i - T_v) \qquad (1)$$

where $K_i$, $M_i$ and $T_i$ are the intrinsic camera parameters, rotation matrix, and translation vector, respectively, specifying the camera position for an input image frame $F_i$, $K_v$, $M_v$ and $T_v$ are the intrinsic camera parameters, rotation matrix, and translation vector, respectively, specifying a camera position for a new virtual view, $p_i$ is the 2-D point in the input image frame, $R_i(p_i)$ is the range value for the 2-D point $p_i$, and $p_v$ is the corresponding 2-D point in an image plane with the specified new virtual view. The superscript "T" indicates a matrix transpose operation, and the superscript "−1" indicates a matrix inversion operation.

A pixel correspondence function $fC_i = fC(W_i, F_i)$ can be defined using the transformation given Eq. (1) to relate the 2-D pixel coordinates in the $i^{th}$ video frame $F_i$ to the corresponding 2-D pixel coordinates in the corresponding warped image $W_i$ with the target viewpoint 520.

The goal is to synthesis the most likely rendered virtual view $SF_v$ to be used for output image 550. We formulate the problem as a probability problem in Bayesian framework, and wish to generate the virtual view $SF_v$ which can maximize the joint probability:

$$P(SF_v | V_T, \{F_i\}, \{C_i\}, \{R_i\}), i \in \phi \qquad (2)$$

where $F_i$ is the $i^{th}$ video frame of the digital video 200, $C_i$ and $R_i$ are corresponding camera parameters and range maps, respectively, $V_T$ is the target viewpoint 520, and $\phi$ is the set of image frame indices that include the main image 500 and the complementary images 510.

To decompose the joint probability function in Eq. (2), the statistical dependencies between variable can be explored. The virtual view $SF_v$ will be a function of the video frames $\{F_i\}$ and the correspondence maps $\{fC_i\}$. Furthermore, as described above, the correspondence maps $\{fC_i\}$ can be constructed with 3-D geometry information, which includes the camera parameters ($C_i$) and range map ($R_i$) for each video frame ($F_i$), and the camera parameters corresponding to the target viewpoint 520 ($V_T$). Given these dependencies, Eq. (2) can be rewritten as:

$$P(SF_v | \{F_i\}, \{fC_i\}) p(\{fC_i\} | V_T, \{C_i\}, \{R_i\}) \qquad (3)$$

Considering the independence of original frames, Bayes' rule allows us to write this as:

$$\frac{\prod_{i=1}^{N} p(F_i | SF_v, fC_i) \cdot p(SF_v)}{\prod_{i=1}^{N} p(F_i)} \prod_{i=1}^{N} p(fC_i | V_T, C_i, R_i) \quad (4)$$

This formulation consists of four parts:

1) $p(F_i|SF_v,fC_i)$ can be viewed as a "color-consistency prior," and should reflect the fact that corresponding pixels in video frame $F_i$ and virtual view $SF_v$ are more likely to have similar color texture. In a preferred embodiment, this prior is defined as:

$$p(F_{i,fC_{i,(x,y)}}|SF_{v,(x,y)}, fC_{i,(x,y)}) = \exp(-\beta_i \cdot \rho(F_{i,fC_{i,(x,y)}} - SF_{v,(x,y)})) \quad (5)$$

where $SF_{v,(x,y)}$ is the pixel value at the (x,y) position of the virtual view $SF_v$, $F_{i,fC_{i,(x,y)}}$ is the pixel value in the video frame $F_i$ corresponding to a pixel position determined by applying the correspondence map $fC_i$ to the (x,y) pixel position, $\beta_i$ is value used to scale the color distance between $F_i$ and $SF_v$. In a preferred embodiment, $\beta_i$ is a function of the camera position distance and is given by $\beta_i = e^{-kD}$, where k is a constant and D is the distance between the camera position for $F_i$ and the camera position for the virtual view $SF_v$. The function $\rho(\cdot)$ is a robust kernel, and in this example is the absolute distance $\rho(\bullet) = |\bullet|$. Note that the quantity $F_{i,fC_{i,(x,y)}}$ corresponds to the warped main image 530 and the warped complementary images 540 shown in FIG. 6. When a particular pixel position corresponds to a hole in one of the warped images, no valid pixel position can be determined by applying the correspondence map $fC_i$ to the (x,y) pixel position. In such cases, these pixels are not included in the calculations.

2) $p(SF_v)$ is a smoothness prior based on the synthesized virtual view $SF_v$, and reflects the fact that the synthesized image should generally be smooth (slowly varying). In a preferred embodiment, it is defined as:

$$p(SF_v) = \prod_{(x,y)} \exp(-\lambda |SF_{v,(x,y)} - AvgN(SF_{v,(x,y)})|) \quad (6)$$

where $AvgN(\cdot)$ means the average value of all neighboring pixels in the 1-nearest neighborhood, and $\lambda$ is a constant.

3) $p(fC_i|V_T,C_i,R_i)$ is a correspondence confidence prior that relates to the confidence for the computed correspondences. The confidence for the computed correspondence will generally be lower when the pixel is in or near a hole in the warped image. The color-consistency prior can provide an indication of whether a pixel location is in a hole because the color in the warped image will have a large difference relative to the color of the virtual view $SF_v$. In a preferred embodiment, we consider a neighborhood around a pixel location of the computed correspondence including the 1-nearest neighbors. The 1-nearest neighbors form a 3×3 square centering at the computed correspondence. We number the pixel locations in this square by j (j=1-9) in order of rows, so that the computed correspondence pixel corresponds to j=5. Theoretically different cases with all possible j should sum up for the objective function, however, we can approximate it by only considering the j which maximize the joint probability with color consistency prior. In one embodiment, the prior can be determined as:

$$p(fC_i|V_T,C_i,R_i) = e^{-\alpha_j}|_{j_{max}} \quad (7)$$

where:

$$e^{-\alpha_j} = \begin{cases} e^{-\theta_1}, & \text{when } j = 5 \\ e^{-\theta_2}, & \text{otherwise.} \end{cases} \quad (8)$$

and $j_{max}$ is the j value that maximizes the quantity $e^{-\alpha_j}p(F_i|SF_v,fC_{i,j})$, $fC_{i,j}$ being the correspondence map for the $j^{th}$ pixel in the neighborhood. It can be assumed that the computed correspondences have higher possibility to be true correspondence than its neighborhoods, so normally we choose $\theta_1 < \theta_2$. In a preferred embodiment, $\theta_1 = 10$ and $\theta_2 = 40$.

4) $p(F_i)$ is the prior on the input video frames 205. We have no particular prior knowledge regarding the input digital video 200, so we can assume that this probability is 1.0 and ignore this term.

Finally, the objective function can be written as:

$$\prod_{i=1}^{N} p(F_i|SF_v, fC_i) \cdot p(fC_i|V_T, C_i, R_i) \cdot p(SF_v) \approx \quad (9)$$

$$\prod_{i=1}^{N} \max_j \left[ \exp(-\beta_i \cdot \rho(F_{i,fC_{i,j,(x,y)}} - SF_{v,(x,y)})) \cdot e^{-\alpha_j} \right] \cdot$$

$$\prod_{(x,y)} \exp(-\lambda |SF_{v,(x,y)} - AvgN(SF_{v,(x,y)})|)$$

In the implementation, we minimize the negative log of the objective probability function, and get the following objective function:

$$\prod_{i=1}^{N} \sum_{(x,y)} \beta_i \min_j \left[ \rho(F_{i,fC_{i,j,(x,y)}} - SF_{v,(x,y)}) + \alpha_j \right] + \quad (10)$$

$$\lambda \sum_{(x,y)} |SF_{v,(x,y)} - AvgN(SF_{v,(x,y)})|$$

where the constant $\lambda$ can be used to determine the degree of smooth constrain that is imposed on the synthesized image.

Optimization of this objective function could be directly attempted using global optimization strategies (e.g., simulated annealing). However, attaining a global optimum using such methods is time consuming, which is not desirable for synthesizing many frames for a video. Since the possibilities for each correspondence are only a few, a more efficient optimization strategy can be used. In a preferred embodiment, the objective function is optimized using a method similar to that described by Fitzgibbon et al. in the article entitled "Image-based rendering using image-based priors" (International Journal of Computer Vision, Vol. 63, pp. 141-151, 2005), which is incorporated herein by reference. With this approach, a variant of an iterated conditional modes (ICM) algorithm is used to get an approximate solution. In a preferred embodiment, the ICM algorithm uses an iterative optimization process that involves alternately optimizing the first term (a color-consistency term "V") and the second term (a virtual view term "T") in Eq. (10). For the initial estimation of the first term, $V^0$, the most likely correspondences (j=5) is chosen for each pixel, and the synthesized results are obtained by a weighted average of correspondences from all frames (i=1–N). The initial solution for the second term, $T^0$, can be obtained by using a well-known mean filter. Alternately, a median filter can be used here instead to avoid outliers and blurring sharp boundaries. The input $V_i^{k+1}$ for next iteration can be set as the linear combination of the output of the previous iteration ($V^k$ and $T^k$):

$$V_i^{k+1} = \frac{V^k + \lambda T^k}{1 + \lambda} \tag{10}$$

where k is the iteration number. Finally, after a few iterations (5 to 10 has been found to work well in most cases), the differences of outputs between iterations will converge, and thus synthesize image for the expected new virtual view. In some embodiments, a predefined number of iterations can be performed. In other embodiments a convergence criterion can be defined to determine when the iterative optimization process has converged to an acceptable accuracy.

The optimization of the objective function has the effect of automatically filling the holes in the warped main image 530. The combination of the correspondence confidence prior and the color-consistency prior has the effect of selecting the pixel values from the warped complementary images 540 that do not have holes to be the most likely pixel values to fill the holes in the warped main image 530.

To evaluate the performance of the above-described methods, experiments were conducted using several challenging video sequences. Two video sequences were from publicly available data sets (in particular, the "road" and "lawn" video sequences described by Zhang et al. in the aforementioned article "Consistent depth maps recovery from a video sequence"), another two were captured using a casual video camera ("pavilion" and "stele") and one was a clip from the movie "Pride and Prejudice" (called "pride" for short).

The view synthesis method described with reference to FIG. 6 was compared to two state-of-the-art methods: an interpolation-based method described by Zhang et al. in the aforementioned article entitled "3D-TV content creation: automatic 2-D-to-3-D video conversion" that employs cubic-interpolation to fill the holes generated by parallax, and a blending method described by Zitnick et al. in the aforementioned article "Stereo for image-based rendering using image over-segmentation" that involves blending virtual views generated by the two closest camera frames to synthesize a final virtual view.

Since ground truth for virtual views is impossible to obtain for an arbitrary viewpoint, an existing frame from the original video sequence can be selected to use as a reference. A new virtual view with the same viewpoint can then be synthesized from a different main image and compared to the reference to evaluate the algorithm performance. For each video, 10 reference frames were randomly selected to be synthesized by all three methods. The results were quantitatively evaluated by determining peak signal-to-noise ratio (PSNR) scores representing the difference between the synthesized frame and the ground truth reference frame.

Figure 7:
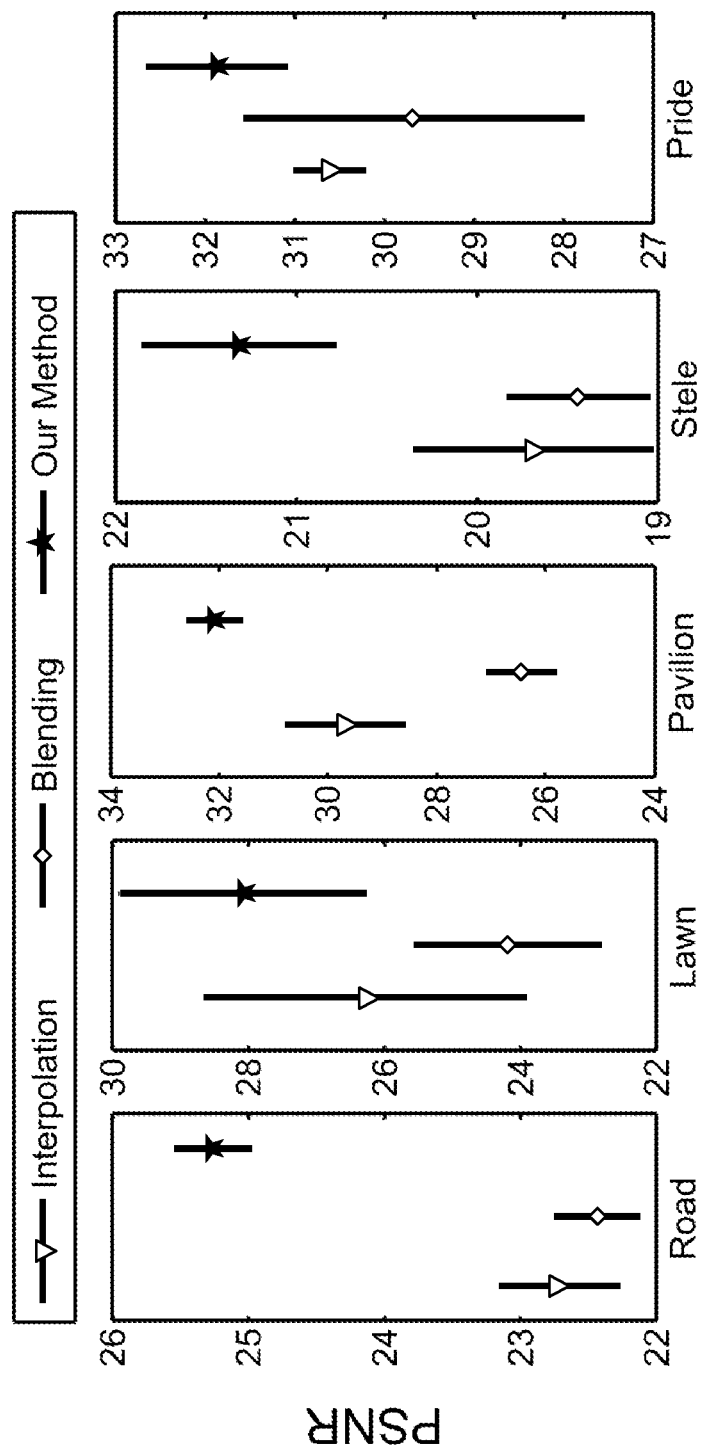
FIG. 7 shows a graph comparing the performance of the present invention to two prior art methods.

FIG. 7 is a graph comparing the calculated PSNR scores for the method of FIG. 6 to those for the aforementioned prior art methods. Results are shown for each of the 5 sample videos that were described above. The data symbol shown on each line shows the average PSNR, and the vertical extent of the lines shows the range of the PSNR values across the 10 frames that were tested. It can be seen that the method of the present invention achieves substantially higher PSNR scores with comparable variance. This implies that the method of the present invention can robustly synthesize virtual views with better quality.

The method for forming an output image 550 with a target viewpoint 520 described with reference to FIG. 6 can be adapted to a variety of different applications besides the illustrated example of forming of a frame for a stabilized video. One such example relates to the Kinect game console available for the Xbox 360 gaming system from Microsoft Corporation of Redmond, Wash. Users are able to interact with the gaming system without any hardware user interface controls through the use of a digital imaging system that captures real time images of the users. The users interact with the system using gestures and movements which are sensed by the digital imaging system and interpreted to control the gaming system. The digital imaging system includes an RGB digital camera for capturing a stream of digital images and a range camera (i.e., a "depth sensor") that captures a corresponding stream of range images that are used to supply depth information for the digital images. The range camera consists of an infrared laser projector combined with a monochrome digital camera. The range camera determines the range images by projecting an infrared structured pattern onto the scene and determining the range as a function of position using parallax relationships given a known geometrical relationship between the projector and the digital camera.

Figure 8:
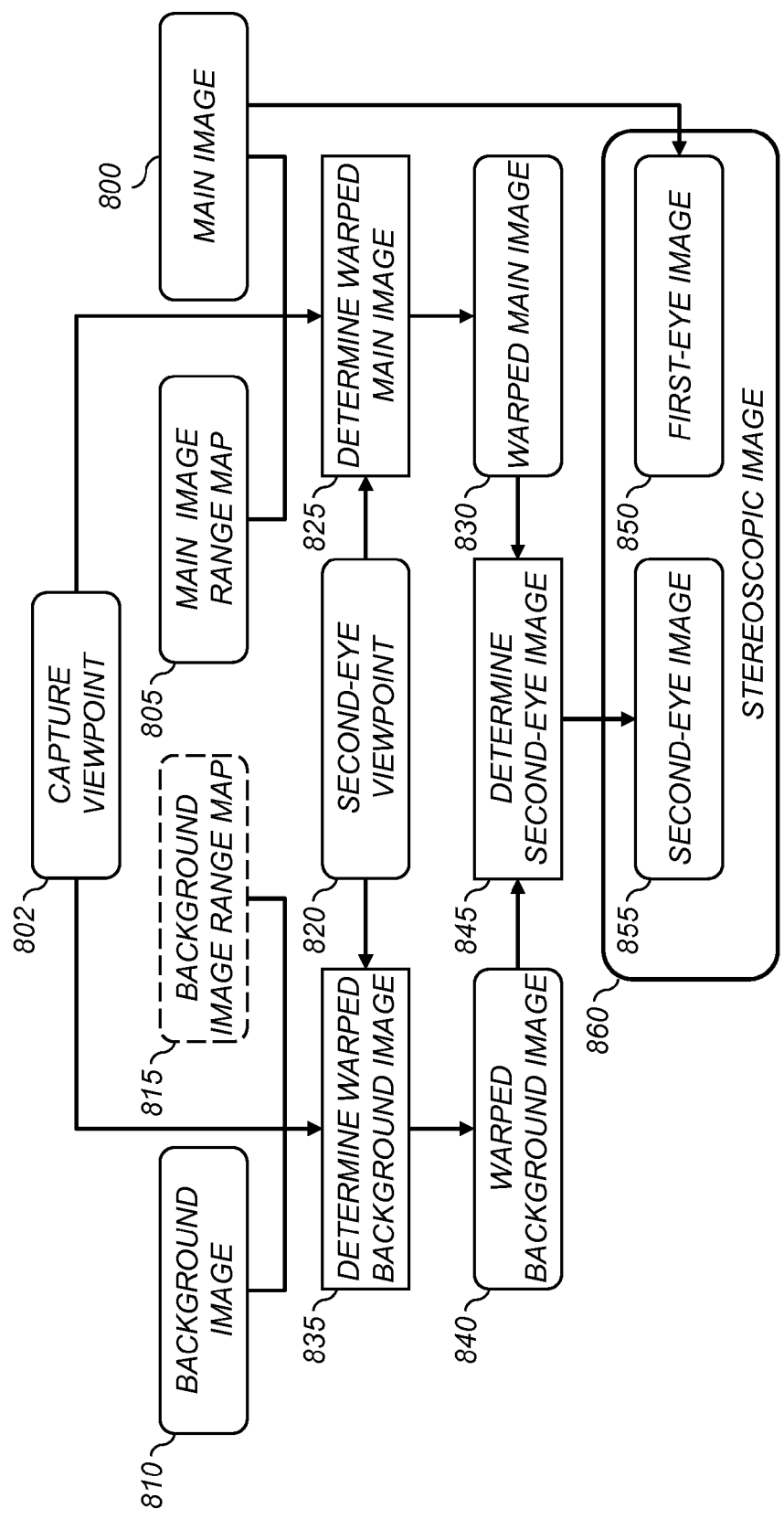
FIG. 8 is a flowchart of a method for forming a stereoscopic image from a monoscopic main image and a corresponding range map.

In some scenarios, it would be desirable to be able to form a stereoscopic image of the users of the gaming system using the image data captured with the digital imaging system (e.g., at a decisive moment of victory in a game). FIG. 8 shows a flowchart illustrating how the method of the present invention can be adapted to form a stereoscopic image 860 from a main image 800 and a corresponding main image range map 805 (e.g., captured using the Kinect range camera). The main image 800 is a conventional 2-D image that is captured using a conventional digital camera (e.g., the Kinect RGB digital camera).

The main image range map 805 can be provided using any range sensing means known in the art. In one embodiment, the main image range map 805 is captured using the Kinect range camera. In other embodiments, the main image range map 805 can be provided using the method described in commonly-assigned, co-pending U.S. patent application Ser. No. 13/004,207 to Kane et al., entitled "Forming 3D models using periodic illumination patterns," which is incorporated herein by reference. In other embodiments, the main image range map 805 can be provided by capturing two 2D images of the scene from different viewpoints and then determining a range map based on identifying corresponding points in the two image, similar to the process described with reference to FIG. 2.

In addition to the main image 800 and the main image range map 805, a background image 810 is also provided as an input to the method. The background image 810 is an image of the image capture environment that was captured during a calibration process without any users in the field-of-view of the digital imaging system. Optionally, a background image range map 815 corresponding to the background image 810 can also be provided. In a preferred embodiment, the main image 800 and the background image 810 are both captured from a common capture viewpoint 802, although this is not a requirement.

The main image range map 805 and the optional background image range map 815 can be captured using any type of range camera known in the art. In some embodiments, the range maps are captured using a range camera that includes an infrared laser projector and a monochrome digital camera, such as that in the Kinect game console. In other embodiments, the range camera includes two cameras that capture images of the scene from two different viewpoints and determines the range values by determining disparity values for corresponding points in the two images (for example, using the method described with reference to FIGS. 2 and 3).

In a preferred embodiment the main image 800 is used as a first-eye image 850 for the stereoscopic image 860, and a second-eye image 855 is formed in accordance with the present invention using a specified second-eye viewpoint 820. In other embodiments, the first-eye image 850 can also be determined in accordance with the present invention by specifying a first-eye viewpoint that is different than the capture viewpoint and using an analogous method to adjust the viewpoint of the main image 800.

A determine warped main image step 825 is used to determine a warped main image 830 responsive to the main image 800, the main image range map 805, the capture viewpoint 802 and the second-eye viewpoint 820. (This step is analogous to the determine warped main image step 525 of FIG. 6.)

A determine warped background image step 835 is used to determine a warped background image 840 responsive to the background image 810, the capture viewpoint 802 and the second-eye viewpoint 820. For cases where a background image range map 815 has been provided, the warping process of the determine warped background image step 835 is analogous to the determine warped complementary images step 535 of FIG. 6.

For cases where the background image range map 815 has not been provided, a number of different approaches can be used in accordance with the present invention. In some embodiments, a background image range map 815 corresponding to the background image 810 can be synthesized responsive to the background image 810, the main image 800 and the main image range map 805. In this case, range values from background image regions in the main image range map 805 can be used to define corresponding portions of the background image range map. The remaining holes (corresponding to the foreground objects in the main image 800) can be filled in using interpolation. In some cases, a segmentation algorithm can be used to segment the background image 810 into different objects so that consistent range values can be determined within the segments.

In some embodiments, the determine warped background image step 835 cab determine the warped background image 840 without the use of a background image range map 815. In one such embodiment, the determination of the warped background image 840 is performed by warping the background image 810 so that background image regions in the warped main image 830 are aligned with corresponding background image regions of the warped background image 840. For example, the background image 810 can be warped using a geometric transform that shifts, rotates and stretches the background image according to a set of parameters. The parameters can be iteratively adjusted until the background image regions are optimally aligned. Particular attention can be paid to aligning the background image regions near any holes in the warped main image 830 (e.g., by applying a larger weight during the optimization process), because these are the regions of the warped background image 840 that will be needed to fill the holes in the warped main image 830.

The warped main image 830 will generally have holes in it corresponding to scene information that was occluded by foreground objects (i.e., the users) in the main image 800. The occluded scene information will generally be present in the warped background image 840, which can be used to supply the information needed to fill the holes. A determine second-eye image step 845 is used to determine the second-eye image 855 by combining the warped main image 830 and the warped background image 840.

In some embodiments, the determine second-eye image step 845 identifies any holes in the warped main image 830 and fills them using pixel values from the corresponding pixel locations in the warped background image. In other embodiments, the Bayesian-based view synthesis approach described above with reference to FIG. 6 can be used to combine the warped main image 830 and the warped background image 840.

The stereoscopic image 860 can be used for a variety of purposes. For example, the stereoscopic image 860 can be displayed on a stereoscopic display device. Alternately, a stereoscopic anaglyph image can be formed from the stereoscopic image 860 and printed on a digital color printer. The printed stereoscopic anaglyph image can then be viewed by an observer wearing anaglyph glass to view the image, thereby providing a 3-D perception. Methods for forming anaglyph images are well-known in the art. Anaglyph glasses have two different colored filters over the left and right eyes of the viewer (e.g., a red filter over the left eye and a blue filter over the right eye). The stereoscopic anaglyph image is created so that the image content intended for the left eye is transmitted through the filter over the user's left eye and absorbed by the filter over the user's right eye. Likewise, the image content intended for the right eye is transmitted through the filter over the user's right eye and absorbed by the filter over the user's left eye. It will be obvious to one skilled in the art that the stereoscopic image 860 can similarly be printed or displayed using any 3-D image formation system known in the art.

In an alternate embodiment, a stereoscopic video can be formed from two input videos that were captured of a common scene using two independently-controlled video cameras. This can correspond, for example, to the case where two photographers are capturing videos of the same event (e.g., the ball falling on New Year's Eve at Times Square) using their respective smart phones. In this scenario, the two photographers will each be capturing their respective digital video from a different camera position. The corresponding frames of the two input videos can therefore be used to determine 3-D scene information for the scene at that moment in time. In accordance with the present invention, this 3-D scene information is used to form a stereoscopic video as will now be described with respect to FIG. 9.

The inputs to the process are a first digital video 900 captured with a first digital video camera and a second digital video 902 captured of the same scene using a second independently operated digital video camera, and the output is a stereoscopic video 960. The stereoscopic video 960 includes a temporal sequence of first-eye frames 965 and a corresponding temporal sequence of second-eye frames 967.

The first digital video 900 and the second digital video 902 each include a temporal sequence of video frames and have associated time durations. While the two time durations may not start and stop at the same times, the method of the described invention relies on the time durations include at least some overlapping time interval. The digital video 900 and the second digital video 902 will each cover different spatial extents of the scene, but they should generally have a substantial amount of overlapping scene content in order to enable the determination of 3-D scene information. The positions of the first and second digital video cameras should preferably differ by no more than a predefined distance in order to avoid having an excessive amount of occlusions.

Figure 9:
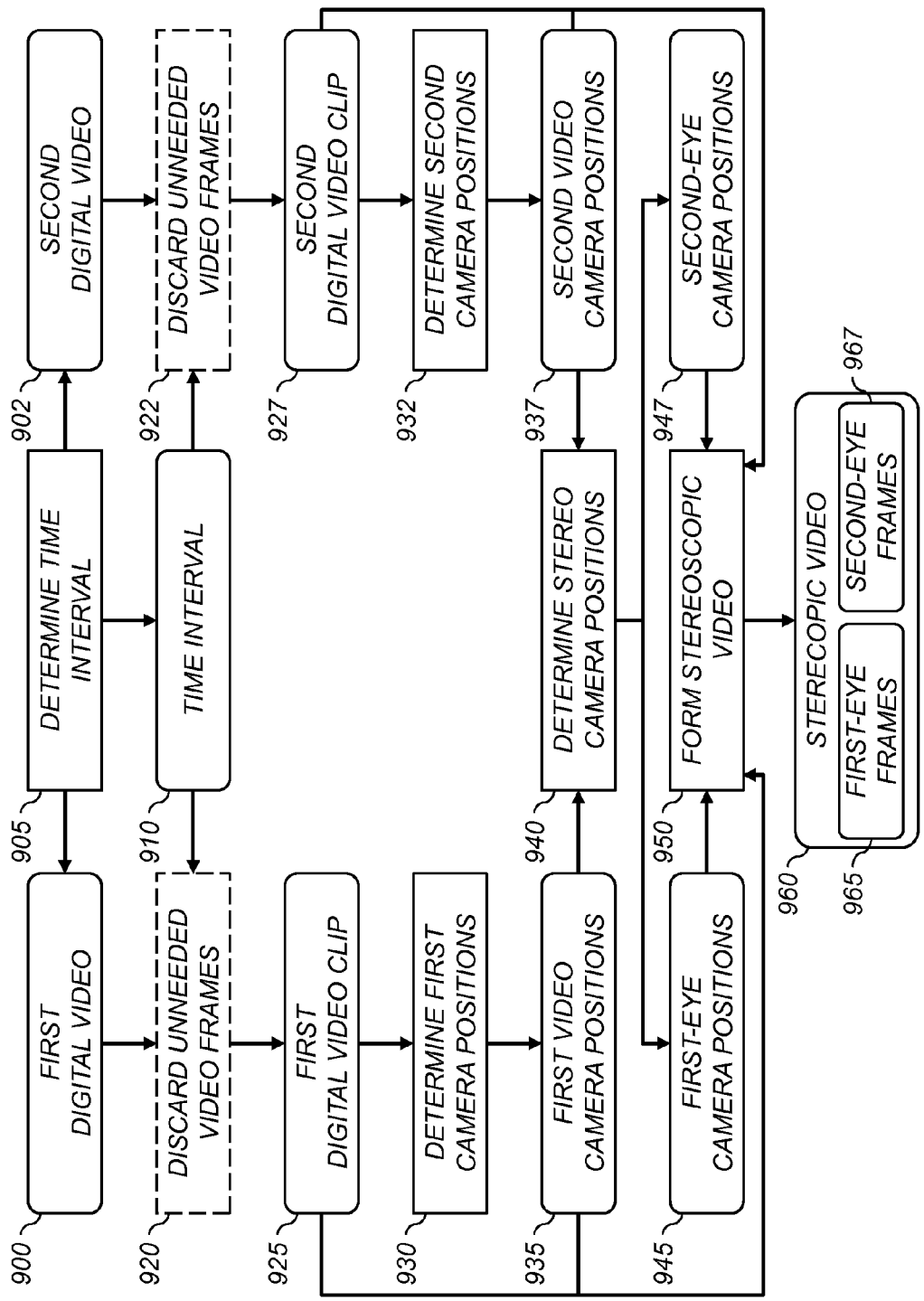
FIG. 9 is a flowchart of a method for forming a stereoscopic video from first and second digital videos in accordance with the present invention.
Figure 10:
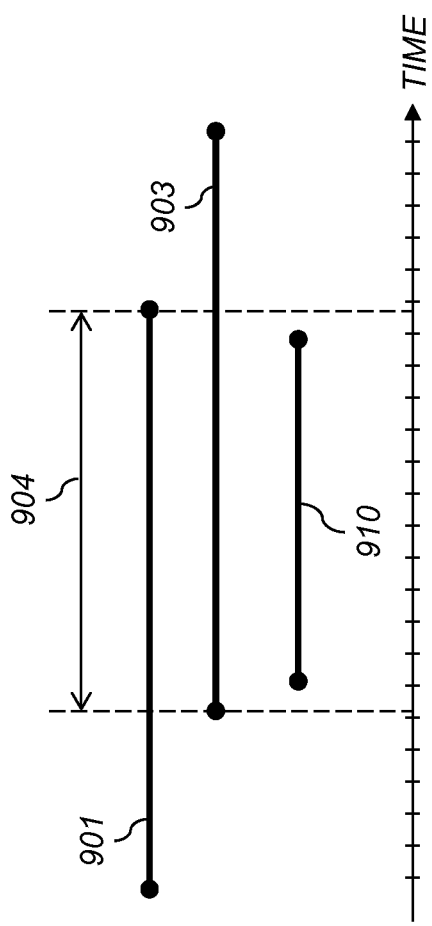
FIG. 10 is a diagram illustrating overlapping time durations for first and second digital videos.

A determine time interval step 905 determines a time interval 910 for the stereoscopic video 960. FIG. 10 shows a timeline showing a first video time duration 901 associated with the first digital video 900 (FIG. 9) and a second video time duration 903 associated with the second digital video 902 (FIG. 9). The first video time duration 901 and the second video time duration 903 including an overlapping time interval 904 where both of the video cameras were recording their respective digital videos.

In order to identify the overlapping time interval 904, it is necessary that the timing of the first video time duration 901 and the second video time duration 903 be related to each other. In some embodiments, both the first digital video 900 and the second digital video 902 include accurate time stamps reflect accurate absolute time values. For example, most smart phones include clock circuitry which is automatically set using signals transmitted from cell phone towers. If metadata associated with the first digital video 900 and the second digital video 902 includes time stamps determined from the clocks, these time stamps can be used to determine the overlapping time interval 904. For cases where accurate time stamps are not available, the content of the first digital video 900 and the second digital video 902 can be automatically analyzed to correlate the scene content in the two videos. In some embodiments, a user interface can be provided that enables a user to manually align the first video time duration 901 and the second video time duration 903. For example, the user can designate a particular frame in the first digital video 900 and then can designate a corresponding frame in the second digital video 900 that was captured at the same time.

The determine time interval step 905 defines the time interval 910, which includes some or all of the overlapping time interval 904. In some embodiments, the determine time interval 905 defines the time interval 910 to be all of the overlapping time interval 904. In other embodiments, a user interface can be provided to allow a user to adjust the starting and ending points of the time interval 910 to include the portion of the video content that should be included in the stereoscopic video 960.

In some embodiments, an optional discard unneeded video frames step 920 is used to discard the video frames in the first digital video 900 that are outside the time interval 910 to provide a first digital video clip 925. Likewise, a discard unneeded video frames step 922 is used to discard the video frames in the second digital video 902 that are outside the time interval 910 to provide a second digital video clip 927. In other embodiments, the remaining processing steps are performed on the full first digital video 900 and second digital video 902 and the appropriate corresponding frames within the time interval 910 are identified using appropriate bookkeeping.

A determine first camera positions step 930 is used to analyze the first digital video clip 925 to determine corresponding first video camera positions 935. Likewise, a determine second camera positions step 932 is used to analyze the second digital video clip 927 to determine corresponding second video camera positions 937. The determine first camera positions step 930 and the determine second camera positions step 932 can use any method known in the art to determine the corresponding camera positions. In a preferred embodiment, these steps use the same methods that were described earlier relative to the determine input camera positions step 405 in FIG. 4, which includes determining extrinsic parameters relating to a 3-D location and a pointing direction for the camera.

A determine stereo camera positions step 940 determines first eye camera positions 945 and second-eye camera positions 947 to be used in the formation of first-eye images 965 and second-eye images 967 for stereoscopic video 960. In some embodiments, the first-eye camera positions 945 are taken to be equal to the first video camera positions 935. In this way, the frames of the first digital video clip 925 can be used directly for the corresponding first-eye frames 965. With this approach, the stereoscopic video 960 will have the appearance of being shot from essentially the same viewpoint as the first digital video 900. In some embodiments, the determine stereo camera positions step 940 may apply a smoothing operation to the first video camera positions 935 to provide a stabilized video similar to what was described with respect to FIG. 4.

In other embodiments, the first-eye camera positions 945 can be determined such that the stereoscopic video 960 has the appearance of being shot from the viewpoint of the second digital video 902, or from some other viewpoint. For example, the first-eye camera positions 945 could be set equal to the average of the first video camera positions 935 and the second video camera positions 937 to simulate an observer positioned halfway between the two cameras. Alternately, a user interface can be provided that enables a user to move the camera along an arbitrary path.

The second-eye camera positions 947 can then be determined by adding a predefined spatial offset to each of the first-eye camera positions 945. The spatial offset is generally applied in a direction perpendicular to the pointing direction of the camera. In some embodiments, the spatial offset can be set equal to the spacing between a typical observer's eyes so that the stereoscopic video 960 has a realistic 3-D appearance. In other embodiments the size of the spatial offset can be adjusted to enhance or reduce the amount of the perceived depth in the stereoscopic image. Generally, the same spatial offset would be used for all of the frames of the stereoscopic video 960, however in some embodiments the spatial offset can be adjusted on a frame-by-frame basis to adjust the magnitude of the perceived depth (for example to exaggerate the perceived depth for certain portions of the stereoscopic video 960).

A form stereoscopic video step 950 is used to form the frames of the stereoscopic video 960 from the frames of the first digital video clip 925 and the second digital video clip 927. Each frame of the stereoscopic video 960 will include a first-eye frame 965 and a second-eye frame 967. In a preferred embodiment, the first-eye frame 965 and the second-eye frame 967 for a particular frame of the stereoscopic video 960 are determined responsive to corresponding frames in the first digital video clip 925 and the second digital video clip 927 that were captured at the same time. In other embodiments, a plurality of frames in the first digital video clip 925 and the second digital video clip 927 can be used in the process of forming each of the first-eye frames 965 and the second-eye frames 967.

Figure 11:
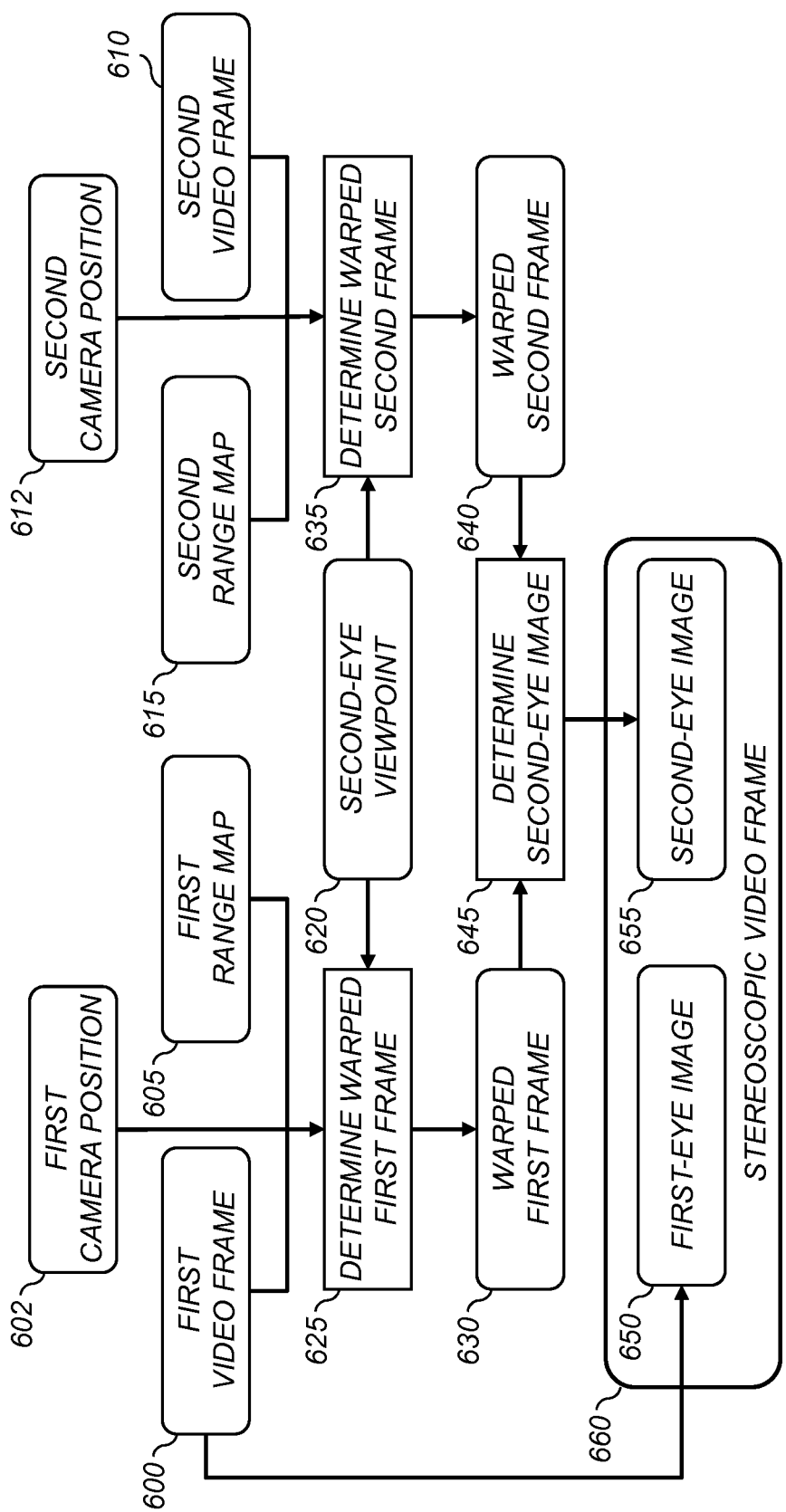
FIG. 11 is a flowchart of a method for forming a stereoscopic video frame according to one embodiment.

Any method known in the art for adjusting the viewpoint of an image can be used by the form stereoscopic video step 950. FIG. 11 illustrates one such method that is based on the approach that was described relative to FIG. 6. A first video frame 600 (from first digital video clip 925 (FIG. 9)) has an associated first camera position 602. A corresponding first range map 605 is determined using any method known in the art, such as those that were described earlier with respect to FIG. 2. Likewise, a second video frame 610 (from second digital video clip 927 (FIG. 9)) has an associated second camera position 612 and a corresponding second range map 615.

In this example, the first-eye camera positions 945 (FIG. 9) will be assumed to be equal to the first video camera positions 935 (FIG. 9) so that the first video frame 600 can be used directly for a first-eye image 650 of resulting stereoscopic video frame 660. A corresponding second-eye image 655 is determined by warping the first video frame 600 and the second video frame 610 to second-eye viewpoint 620. A determine warped first frame step 625 warps the first video frame 600 to determine warped first frame 630 responsive to the first range map 605, the first camera position 602 and the second-eye viewpoint 620. Likewise, a determine warped second frame step 635 warps the second video frame 610 to determine warped second frame 640 responsive to the second range map 615, the second camera position 612 and the second-eye viewpoint 620. (In a preferred embodiment, the processes used by the determine warped first frame step 625 and the determine warped second frame step 635 are analogous to that of the determine warped main image step 525 and the determine warped complementary images step 535 in FIG. 6.)

A determine second-eye image 645 then combines the warped first frame 630 and the warped second frame 640 to determine the second-eye image 655. Typically, the warped first frame 630 may include one or more holes corresponding to scene content that was occluded in the first video frame 600 and the warped second frame 640 may include one or more holes corresponding to scene content that was occluded in the second video frame 610. In a preferred embodiment, pixel values to fill the one or more holes in the warped first frame 630 are determined using pixel values at corresponding pixel locations in the warped second frame 640. For pixels where neither the warped first frame 630 nor the warped second frame 640 have holes, the pixel values for the second-eye image 655 can be set equal to the corresponding pixel values in either the warped first frame 630 or the warped second frame 640. Alternately, the pixel values for the second-eye image 655 can be determined by averaging the corresponding pixels values in the warped first frame 630 nor the warped second frame 640.

Figure 12:
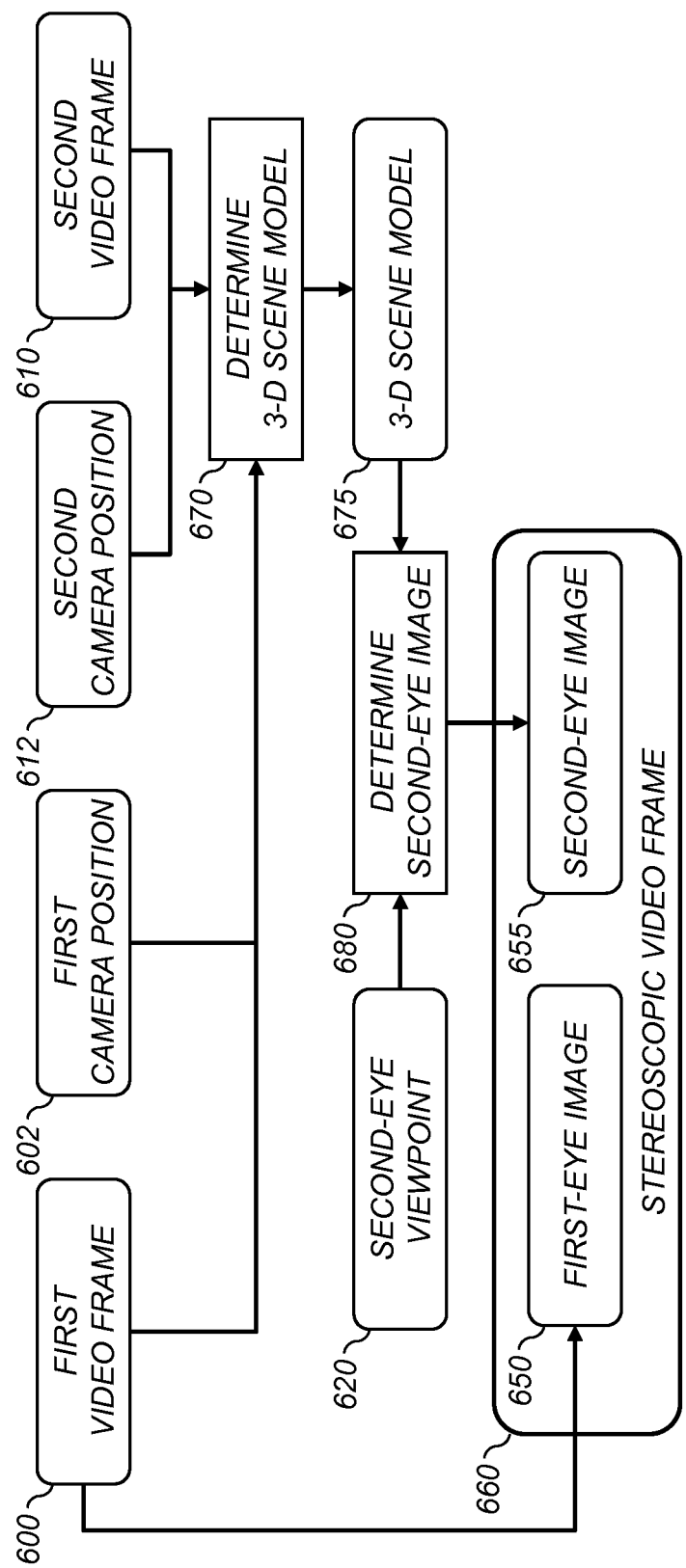
FIG. 12 is a flowchart of a method for forming a stereoscopic video frame according to a second embodiment.

In an alternate embodiment, the form stereoscopic video step 950 of FIG. 9 uses the method shown in FIG. 12 to determine the stereoscopic video frames 660. As in the method of FIG. 11, the first-eye camera positions 945 (FIG. 9) will be assumed to be equal to the first video camera positions 935 (FIG. 9) so that the first video frame 600 can be used directly for the first-eye image 650 of the stereoscopic video frame 660.

According to the method of FIG. 12, a determine 3-D scene model step 670 is used to form a 3-D scene model by analyzing the first video frame 600 and the second video frame 610, together with the corresponding camera positions. The determine 3-D scene model step 670 can use any method known in the art to determine the 3-D scene model 675.

Generally, methods for determining 3-D scene models from 2-D images involve using three main steps to form 3-D point clouds. First, a set of corresponding features in a pair of images are determined using a feature matching algorithm. One such approach is described by Lowe in the article "Distinctive image features from scale-invariant keypoints" (International Journal of Computer Vision, Vol. 60, pp. 91-110, 2004). This method involves forming a Scale Invariant Feature Transform (SIFT), and the resulting corresponding features are sometimes referred to as "SIFT features".

Next, a Structure-From-Motion (SFM) algorithm, such as that described Snavely et al. in the aforementioned article entitled "Photo tourism: Exploring photo collections in 3-D" is used to estimate camera parameters for each image. The camera parameters generally include extrinsic parameters that provide an indication of the camera position (including both a 3-D camera location and a pointing direction) and intrinsic parameters related to the image magnification.

Finally, a Multi-View-Stereo (MVS) algorithm is used to combine the images, the corresponding features and the camera parameters to generate a dense 3-D point cloud. Examples of MVS algorithms are described by Goesele et al. in the article "Multi-view stereo for community photo collections" (Proc. International Conference on Computer Vision, pp. 1-8, 2007), and by Jancosek et al. in the article "Scalable multi-view stereo" (Proc. International Conference on Computer Vision Workshops, pp. 1526-1533, 2009). The performance of various MVS algorithms is compared in an article Seitz et al. entitled "A comparison and evaluation of multi-view stereo reconstruction algorithms" (Proc. Computer Vision and Pattern Recognition, Vol. 1, pp. 519-528, 2006).

In a preferred embodiment, the determine 3-D scene model step 670 uses one of the methods described in commonly-assigned, co-pending U.S. patent application Ser. No. 13/400,663, entitled "3D scene model from collection of images," to Wang, which is incorporated herein by reference. In accordance with this method, digital images with overlapping scene content captured from different camera positions are analyzed to determine a 3-D scene model of a scene.

A determine second-eye image step 680 is then used to determine the second-eye image 655 by using the 3-D scene model 675 to render an image of the scene from the second-eye viewpoint 620. Methods for rendering images from 3-D scene models 675 are well-known in the computer graphics art, and any such method can be used in accordance with the present invention.

While the embodiments described with reference to FIGS. 9-12 have all been based on two input digital videos (i.e., first digital video 900 and second digital video 902), it will be obvious to one skilled in the art that the method of the present invention can be generalized to use more than two input digital videos. Generally, the use of additional input digital videos can increase the quality of the resulting stereoscopic video 960. For example, a third input digital video can be provided captured using a third digital video camera, wherein the third input digital video has an overlapping time duration and includes overlapping scene content with the first digital video 900 and the second digital video 902. The form stereoscopic video step 950 can then use the third digital video together with corresponding third video camera positions during the formation of the stereoscopic video 960.

The above-described method for forming a stereoscopic video 960 from a first digital video 900 and a second digital video 902 can be used in a wide variety of different devices and workflows. In one scenario, two users have video-enabled smart phones and are capturing video at the same event (e.g., a high school sporting event, a birthday party, or a New Year's Eve at Times Square). The two users can decide to combine their respective videos to form a stereoscopic video 960. One of the users can then transmit the digital video captured on their smart phone to the other person's smart phone across a wireless communication link (e.g., a cell phone network, a Bluetooth connection or a WiFi connection). A software app can then be executed by a data processor in the smart phone to perform the method of the present invention and form the stereoscopic video. In some embodiments, the smart phone can include software that searches for other smart phones in the vicinity that are capturing video and can send a request to the other smart phone to request permission to share their captured video.

In another scenario, both users can upload their captured videos to a network server (e.g., youtube.com). A data processor associated with the network server can then be used to execute a software application to form the stereoscopic video 960. In some cases, the users may cooperatively upload their videos and coordinate to initiate the formation of the stereoscopic video 960.

In some embodiments, the two smart phones can wirelessly communicate with each other to determine that the input digital videos are appropriate to use for forming the stereoscopic video 960. If appropriate digital videos are identified, then they can be tagged with appropriate special metadata tags and uploaded to a network server. Application software running on a data processor associated with the network server can then initiate the formation of the stereoscopic video 960 in response to detecting the presence of the special metadata tags.

In other cases, the users may individually upload their videos without any specific knowledge about other videos that may be available. One of the users can then initiate an automatic search of the collection of videos that have been uploaded to the server to see whether there is a second digital video 902 that has been uploaded that would be well-suited to combine with their first digital video 900 to form the stereoscopic video 960. For example, the automatic search can examine capture time metadata and capture location metadata (e.g., geographical coordinates determined using a GPS sensor) associated with the uploaded videos to determine whether there are any video that were captured with an overlapping time duration at geographical coordinates that are within a predefined distance away from the geographical coordinates of the camera used to capture the first digital video 900. In some embodiments, the automatic search can search a plurality of different servers, or can perform a broad internet search to identify appropriate candidate videos.

If one or more candidate videos are identified, the candidate videos can be analyzed to determine whether the captured scene content overlaps sufficiently with the scene content of the first digital video 900. Assuming that an appropriate candidate video is identified, a software application can be executed on a data processor associated with the server to form the stereoscopic video 960. Alternatively, the videos can be downloaded to a local computer, or transferred to some other system where the software for forming the stereoscopic video 960 can be executed.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 digital video
205 video frame
210 determine disparity maps step
215 disparity map series
220 disparity map
225 refine disparity maps step
230 refined disparity map series
235 refined disparity map
240 determine range maps step
245 range map series
250 range map
305 select video frame step
310 particular video frame
315 determine extrinsic parameters step
320 extrinsic parameters
325 determine intrinsic parameters step
330 intrinsic parameters
335 define candidate frames step
340 candidate video frames
345 determine similarity scores step
350 image similarity scores
355 select subset step
360 video frames subset
365 determine position difference scores step
370 position difference scores
375 select video frame step
380 selected video frame
385 determine disparity map step
405 determine input camera positions step
410 input camera positions
415 determine input camera path step
420 input camera path
425 determine smoothed camera path step
430 smoothed camera path
432 determine smoothed camera positions step
434 smoothed camera positions
435 determine stabilized video step
440 stabilized video
445 stabilized video frames
450 determine second-eye smoothed camera positions step
455 second-eye smoothed camera positions
460 determine second-eye stabilized video step
465 second-eye stabilized video
470 second-eye stabilized video frames
475 stabilized stereoscopic video
480 input camera path graph
485 smoothed camera path graph
500 main image
505 set of complementary images
510 complementary image
515 viewpoint
520 target viewpoint
525 determine warped main image step
530 warped main image
535 determine warped complementary images step
540 warped complementary images
545 determine output image step
550 output image
600 first video frame
602 first camera position
605 first range map
610 second video frame
612 second camera position
615 second range map
620 second-eye viewpoint
625 determine warped first frame step
630 warped first frame
635 determine warped second frame step
640 warped second frame
645 determine second-eye image step 650 first-eye image
655 second-eye image
660 stereoscopic video frame
670 determine 3-D scene model
675 3-D scene model
680 determine second-eye image step
800 main image
802 capture viewpoint
805 main image range map
810 background image
815 background image range map
820 second-eye viewpoint
825 determine warped main image step
830 warped main image
835 determine warped background image step
840 warped background image
845 determine second-eye image step
850 first-eye image
855 second-eye image
860 stereoscopic image
900 first digital video
901 first video time duration
902 second digital video
903 second video time duration
904 overlapping time interval
905 determine time interval step
910 time interval
920 discard unneeded video frames step
922 discard unneeded video frames step
925 first digital video clip
927 second digital video clip
930 determine first camera positions step
932 determine second camera positions step
935 first video camera positions
937 second video camera positions
940 determine stereo camera positions step
945 first-eye camera positions
947 second-eye camera positions
950 form stereoscopic video step
960 stereoscopic video
965 first-eye frames
967 second-eye frames

The invention claimed is:

1. A method for forming a stereoscopic video comprising:
receiving, by a video forming device, a first digital video captured by a first digital camera and a second digital video captured by a second digital camera, wherein the first digital video and the second digital video were captured of a common scene and have overlapping time durations, and wherein the first digital video and the second digital video each include a temporal sequence of video frames;
determining, by the video forming device, a first-eye viewpoint and a second-eye viewpoint;
forming, by the video forming device, a first-eye frame with the first-eye viewpoint based on a first video frame of the first digital video;
forming, by the video forming device, a second-eye frame by:
warping the first video frame of the first digital video to the first-eye viewpoint;
warping a second video frame of the second digital video to the second-eye viewpoint; and
combining the warped first video frame and the warped second video frame to form the second-eye frame; and
combining, by the video forming device, the first-eye frame and the second-eye frame to form a stereoscopic video frame.

2. The method of claim 1, wherein the first digital video and the second digital video are automatically identified from a collection of digital videos based on associated metadata indicating capture times and capture locations for the digital videos in the collection of digital videos.

3. The method of claim 2, wherein the identification of the first digital video and the second digital video further includes analyzing the digital videos in the collection of digital videos to determine whether the digital videos contain sufficiently overlapping scene content.

4. The method of claim 1, wherein the first digital video and the second digital video are uploaded to a network server, and wherein the stereoscopic video is formed using a software application executed by a data processor associated with the network server.

5. The method of claim 4, wherein the first digital camera and the second digital camera wirelessly communicate with each other to determine that the first digital video and the second digital video are appropriate to use for forming the stereoscopic video, and wherein metadata is associated with the first digital video uploaded to the network server and the second digital video uploaded to the network server to indicate that the first digital video uploaded to the network server and the second digital video uploaded to the network server are to be used to form the stereoscopic video.

6. The method of claim 1, further comprising:
determining, by the video forming device, a first digital camera position for the first video frame of the first digital video by analyzing the first digital video; and
determining, by the video forming device, a second digital camera position for the second video frame of the second digital video by analyzing the second digital video,
wherein the first digital camera position relates to a position of the first digital camera when the first video frame was captured, and wherein the second digital camera position relates to a position of the second digital camera when the second video frame was captured.

7. The method of claim 6, wherein the first digital video is analyzed using a structure-from-motion algorithm.

8. The method of claim 1, further comprising:
determining, by the video forming device, a first digital camera position for the first video frame of the first digital video using a position sensor of the first digital camera; and
determining, by the video forming device, a second digital camera position for the second video frame of the second digital video using a position sensor of the second digital camera.

9. The method of claim 1, wherein the first-eye viewpoint is a first digital camera position or a second digital camera position.

10. The method of claim 1, wherein the first-eye viewpoint is determined by applying a smoothing operation to a plurality of first digital camera positions and a plurality of second digital camera positions.

11. The method of claim 1, wherein the second-eye viewpoint is determined by adding a predefined offset to the first-eye viewpoint.

12. The method of claim 1, wherein the video frames of the first digital video are used for the first-eye frames.

13. The method of claim 1, further comprising receiving an additional digital video that includes a temporal sequence of video frames, and wherein the forming the first-eye frame and the forming the second-eye frame is also based on a video frame of the additional digital video.

14. The method of claim 1, wherein the forming the second-eye frame further comprises:
   determining a first range map corresponding to the first video frame of the first digital video and a second range map corresponding to the second video frame of the second digital video; and
   wherein warping the first video frame is based on the first range map, and wherein the warping the second video frame is based on the second range map.

15. The method of claim 1, wherein the warped first video frame includes holes corresponding to scene content that was occluded in the first video frame in the first digital video, and wherein the combining the warped first video frame and the warped second video frame fills the holes.

16. The method of claim 1, wherein the forming the second-eye frame further comprises:
   determining a three-dimensional model of a scene of the first digital video or of the second digital video; and
   synthesizing the second-eye frame based on the three-dimensional model of the scene and the second-eye viewpoint.

17. The method claim 1, wherein a path of the first digital camera while capturing the first digital video is different than a path of the second digital camera while capturing the second digital video.

18. The method of claim 1, wherein the combining the warped first video frame and the warped second video frame is based on a weighted combination of corresponding pixels.

19. The method of claim 1, wherein a plurality of stereoscopic video frames comprise a stereoscopic video that has a time interval that is the same as the time interval of the first digital video and the second digital video.

20. The method of claim 1, further comprising storing the stereoscopic video frame in a processor-accessible memory.

21. The method of claim 1, further comprising forming, by the video forming device, a respective first-eye frame for each of a plurality of stereoscopic video frames, wherein each respective first-eye frame has the first-eye viewpoint.

22. The method of claim 21, further comprising forming a respective second-eye image for each of the plurality of stereoscopic video frames by:
   warping the respective first video frame of the first digital video to the second-eye viewpoint;
   warping a respective second video frame of the second digital video to the second eye viewpoint; and
   combining the warped respective first video frame and the warped respective second video frame to form a respective second-eye frame.

23. A non-transitory computer-readable medium including computer-readable instructions that, upon execution by a processor, cause a device to:
   receive a first digital video captured by a first digital camera and a second digital video captured by a second digital camera, wherein the first digital video and the second digital video were captured of a common scene and have overlapping time durations; and wherein the first digital video and the second digital video each include a temporal sequence of video frames;
   determine a first-eye viewpoint and a second-eye viewpoint;
   form a first-eye frame with the first-eye viewpoint based on a first video frame of the first digital video;
   form a second-eye image by:
   warping the first video frame of the first digital video to the first-eye viewpoint;
   warping a second video frame of the second digital video to the second-eye viewpoint; and
   combining the warped first video frame and the warped second video frame to form the second-eye frame; and
   combine the first-eye frame and the second-eye frame to form a stereoscopic video frame.

24. A system comprising:
   a first digital camera configured to capture a first digital video having a temporal sequence of video frames;
   a second digital camera configured to capture a second digital video having a temporal sequence of video frames, wherein the first video and the second digital video were capture of a common scene and have overlapping time durations;
   a processor communicatively coupled to the first digital camera and the second digital camera, wherein the processor is configured to:
   determine a first-eye viewpoint and a second-eye viewpoint;
   form a first-eye frame with the first-eye viewpoint based on a first video frame of the first digital video;
   form a second-eye image by:
   warping the first video frame of the first digital video to the first-eye viewpoint;
   warping a second video frame of the second digital video to the second-eye viewpoint; and
   combining the warped first video frame and the warped second video frame to form the second-eye frame; and
   combine the first-eye frame and the second-eye frame to form a stereoscopic video frame.

* * * * *